(12) United States Patent
Van Der Seylberg et al.

(10) Patent No.: US 9,038,797 B2
(45) Date of Patent: May 26, 2015

(54) SWITCHABLE COUPLING

(75) Inventors: Frank Van Der Seylberg, Chemnitz (DE); Peter Tenberge, Chemnitz (DE); Rico Baumgart, Limbach-Oberfrohna (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 183 days.

(21) Appl. No.: 13/885,872

(22) PCT Filed: Nov. 15, 2011

(86) PCT No.: PCT/DE2011/075273
§ 371 (c)(1),
(2), (4) Date: Jul. 31, 2013

(87) PCT Pub. No.: WO2012/065606
PCT Pub. Date: May 24, 2012

(65) Prior Publication Data
US 2013/0299297 A1    Nov. 14, 2013

(30) Foreign Application Priority Data

Nov. 16, 2010    (DE) ..................... 20 2010 012 903 U

(51) Int. Cl.
*F16D 11/14*    (2006.01)
*F16D 27/112*    (2006.01)
(Continued)

(52) U.S. Cl.
CPC .............. *F16D 11/14* (2013.01); *F16D 27/112* (2013.01); *F16D 23/02* (2013.01); *F16D 27/118* (2013.01)

(58) Field of Classification Search
CPC ..... F16D 11/14; F16D 27/112; F16D 27/118; F16D 27/14; F16D 2013/0687; F16D 23/02

USPC ................ 192/53.1, 53.2, 69.9, 84.92, 84.96, 192/84.961
See application file for complete search history.

(56) References Cited

U.S. PATENT DOCUMENTS 2,912,088 A * 11/1959 Breyer .......................... 192/53.2
2,962,141 A * 11/1960 Rudisch ....................... 192/53.2
(Continued)

FOREIGN PATENT DOCUMENTS

DE    1 575 762    8/1969
DE    103 31 927 B3    2/2005
(Continued)

OTHER PUBLICATIONS

International Search Report with English translation dated May 7, 2012 (four (4) pages).

*Primary Examiner* — Edwin A Young
*Assistant Examiner* — Colby M Hansen
(74) *Attorney, Agent, or Firm* — Michael Soderman

(57) ABSTRACT

A switchable coupling with a coupling system between a driving element and an output element is provided. The switchable coupling includes an actuator, an elastic actuating element and a switching element movable between starting, central and end positions. In the central position the switchable coupling has a different state (open or closed) than in the starting position. The switchable coupling further includes a bolt constrained between first and second bolt stops. Axial movement of the switching element causes operative surfaces connected to the switching element or the bolt to engage with elements on other of the switching element and the bolt, such that the bolt rotates relative to the switching element. The bolt alternately moves relative to the switching element into a first relative position blocking switching element movement in the central position, and into a second relative position permitting movement of the switching element toward the starting position.

8 Claims, 17 Drawing Sheets

(51) Int. Cl.
 *F16D 27/118* (2006.01)
 *F16D 23/02* (2006.01)

(56) References Cited

U.S. PATENT DOCUMENTS

| | | |
|---|---|---|
| 3,307,666 A | 3/1967 | Miller et al. |
| 2005/0155826 A1 | 7/2005 | Kohno et al. |
| 2005/0258013 A1 | 11/2005 | Stevenson et al. |
| 2006/0283683 A1 | 12/2006 | Miller |

FOREIGN PATENT DOCUMENTS

| | | |
|---|---|---|
| DE | 10 2005 001909 A1 | 8/2005 |
| DE | 10 2005 022 218 A1 | 12/2005 |
| EP | 1 378 677 A2 | 1/2004 |
| WO | WO 02/50445 A1 | 6/2002 |

\* cited by examiner

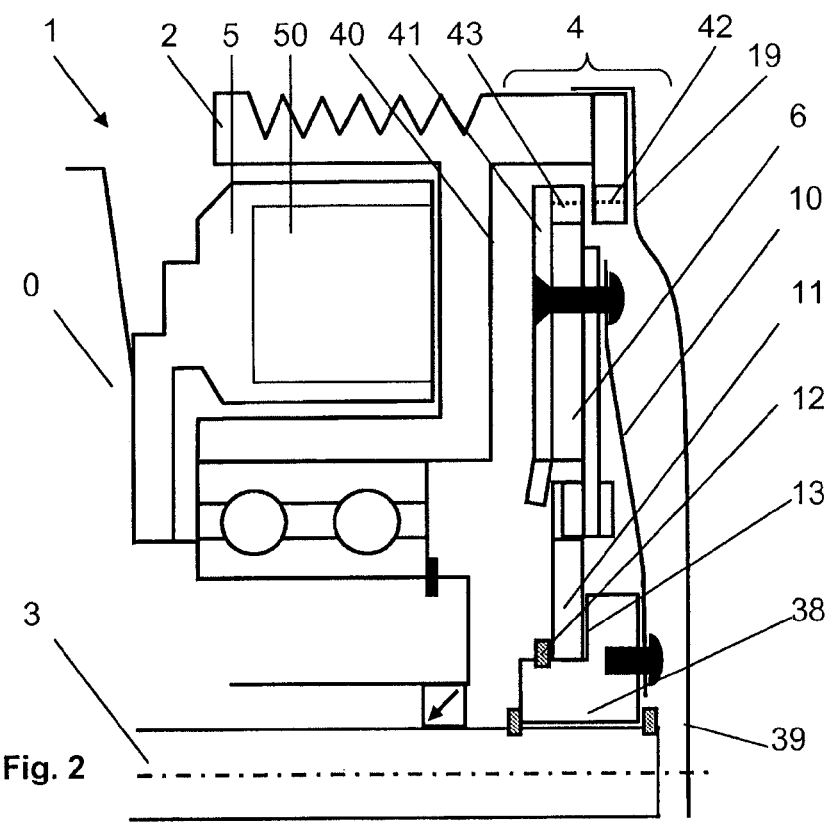
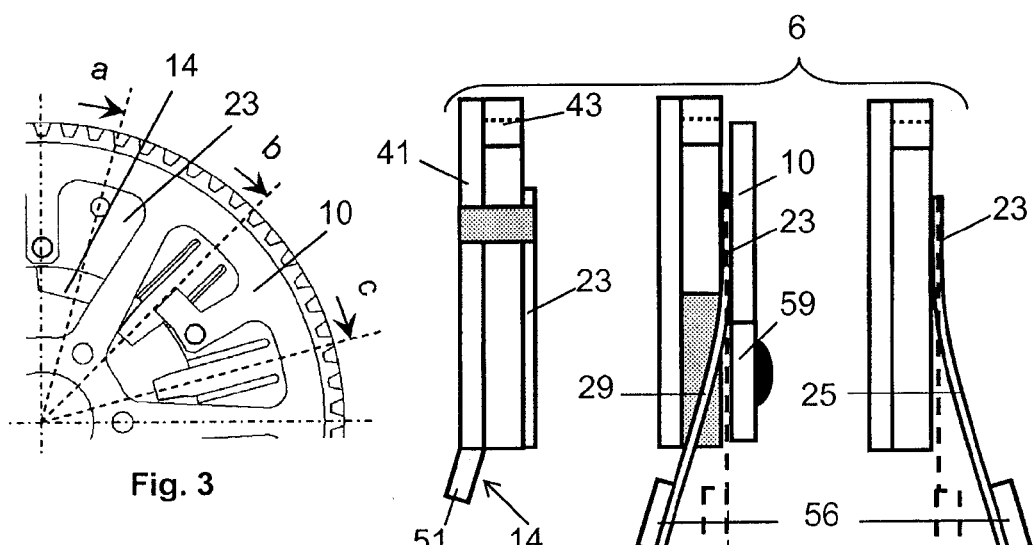

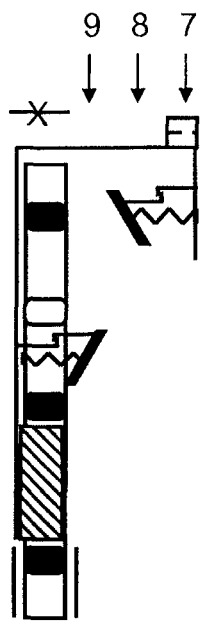 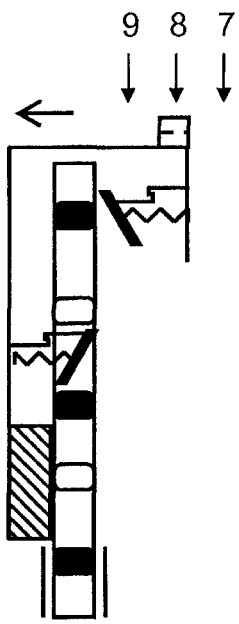 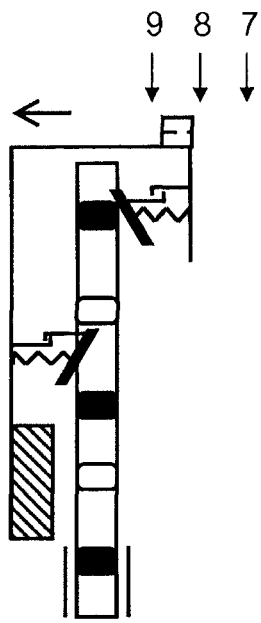
Fig. 12a     Fig. 12b     Fig. 12c
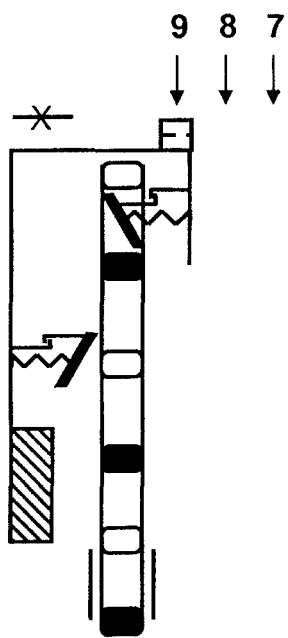 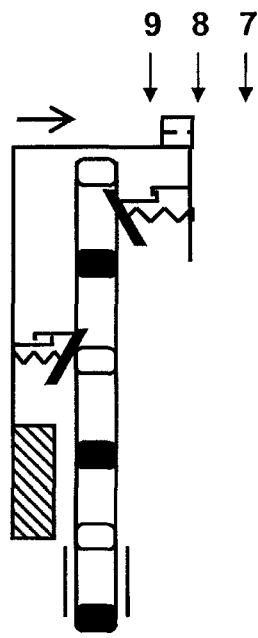 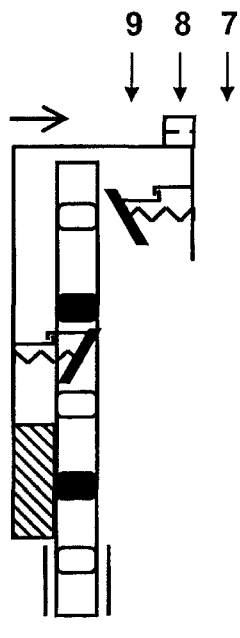
Fig. 12d     Fig. 12e     Fig. 12f

SWITCHABLE COUPLING

CROSS REFERENCE TO RELATED APPLICATIONS

This application is a National Phase of PCT International Application No. PCT/DE2011/075273, filed Nov. 15, 2011, which claims priority under 35 U.S.C. §119 from German Patent Application No. 20 2010 012 903.6, filed Nov. 16, 2010, the entire disclosures of which are herein expressly incorporated by reference.

BACKGROUND AND SUMMARY OF THE INVENTION

The invention relates to a switchable coupling that is disposed between a driving element that is, for example, embodied as a pulley and an output element, wherein the switchable coupling includes a coupling system for creating a non-positive- and/or positive-locking connection between the driving element and the output element, as well as an actuator, preferably an electromagnetic actuator, a switching element in the operative vicinity of the actuator, as well as at least one elastic actuating element that is disposed between the output element and the switching element, and wherein the switching element is movable in an infinitely variable manner between a starting position via a central position as far as an end position, wherein, in the central position of the switching element, the switchable coupling has a different state (open or closed) than in the starting position, and wherein the elastic actuating element applies a force on the switching element in the direction of the starting position, and wherein the actuator only exercises forces on the switching element in the direction of the end position whose maximum value exceeds the force value of the elastic actuating element in any position.

Such preferably electromagnetically actuated couplings are known in the prior art. For example, European patent document EP 1378677 discloses a switchable coupling between a pulley as driving element and a shaft as output element. This switchable coupling also has an electromagnetic actuator whose force moves, in the state when current is applied, a switching element and further components of the coupling towards each other in such a manner that they are brought into a positive-locking engagement. Furthermore, this switchable coupling also includes an elastic actuating element that applies a spring force, countering the force of the actuator, to the switching element, such that, after the actuator has been switched off, the spring force moves the switching element out of engagement with the further parts of the coupling. Therefore, in the state "coupling=open" in this switchable coupling, the actuator is not active and does not consume energy. In the state "coupling=closed," the actuator in this switchable coupling must, however, be permanently engaged and can then, as an electromagnetic actuator, be supplied with current, and wherein the actuator permanently consumes energy.

DE 1 575 762 also discloses an electromagnetic tooth clutch between a driving element and an output element. For the switching state "coupling=closed," the electromagnetic actuator in this switchable coupling must also be permanently supplied with current. Although it is possible to reduce the magnetic force required therein by the shape of the switching teeth, complete cancellation is not possible.

German patent document DE 10331927 B3 discloses a clutch actuator for a switchable coupling between a driving element and an output element. In this coupling, preferably in use for utility vehicles, the clutch actuator does not act directly on the elastic actuating element of the coupling but on a transmission that reduces the required force in the clutch actuator for opening the coupling. Nonetheless, with this switchable coupling as well, the clutch actuator consumes energy to maintain the switchable coupling in the state "coupling=open." When the energy supply to the clutch actuator is switched off, the elastic actuating element ultimately counteracts the force of the clutch actuator in this instance as well and switches the switchable coupling to the state "coupling=closed," especially in the manner that is known, as a matter of principle, from most starting clutches in motor vehicles.

This prior art thus constitutes the basis for an initial partial object of the invention, which is to provide a switchable coupling that is able to maintain the two switching states "coupling=open" and "coupling=closed" without the supply and consumption of energy, and whose actuator uses energy only for the changeover between the two switching states.

A switchable coupling that achieves this partial object is disclosed in German patent document DE 102005001909 A1. Said coupling has an elastic actuating element that is a bistable spring and therefore able to assume two shapes. A switchable coupling having such a spring can be configured such that the switching states "coupling=open" and "coupling=closed" can be held stable without supplying energy to an actuator. However, switching such a coupling requires an actuator that is able to act on the bistable spring in two opposite directions of force.

According to this prior art, the above-captioned object shall be amended in such a manner that the switchable coupling must be configured such that the actuator thereof must only generate forces in one direction, thus making a single-side-operating actuator design, preferably an electromagnetic actuator, a possibility. This allows for the implementation of simple principles of operation, as well as the realization of savings in terms of construction space and costs.

German patent document DE 102005022218 A1 discloses a further relevant representative from the prior art regarding an actuating system for a switchable coupling. This switchable coupling has an actuator that acts only in one direction on a switching element of the coupling, specifically against the force of an elastic actuating element. In the closed state, this coupling is held by an automatically locking mechanism functioning according to the operative principle of a free-running roller or ball. However, to switch this switchable coupling from the switching state "coupling=closed" to the switching state of "coupling=open," said coupling requires a second actuator in order to release the locking unit mechanism again.

Therefore, the underlying object of the present invention is the implementation of a switchable coupling that is able to maintain the two switching states "coupling=open" and "coupling=closed" without any supply or consumption of energy, and whose actuator must only generate forces for the changeover operation, specifically only in one direction, between the two switching states. The switchable coupling according to the invention shall also not need any additional actuating elements or further actuators for possibly needed locking unit mechanisms that may be required for holding certain switching states.

This object is achieved with a switchable coupling is disposed between a driving element and an output element and includes a coupling system for creating a non-positive- and/or positive-locking connection between the driving element and the output element, as well as, preferably, an electromagnetic actuator and a switching element in the operative vicinity of the actuator and at least one elastic actuating element that is disposed between the output element and the switching element, wherein the switching element is movable in an infinitely variable manner between a starting position, and via a central position as far as an end position, and wherein the switchable coupling has a different state (open or closed) in the central position than in the starting position, and wherein the elastic actuating element applies a force on the switching element in the direction of the starting position, and wherein the actuator only applies forces on the switching element in the direction of the end position whose maximum value exceeds in each position the force value of the elastic actuating element, and according to the invention a locking unit is rotatably disposed in the circumferential direction on the output element or on parts connected to the output element but held in the axial direction between a first locking unit stop and a second locking unit stop, and wherein a rotational system is connected to the switching element or the locking unit that includes first operative surfaces that, with a movement of the switching element from a position shortly behind the central position to as far as the end position, come into contact with first slanting molded elements on the locking unit or first slanting molded elements on the switching element, thereby preloading first resilient rotational elements in such a manner that the locking unit is rotated by a first angular pitch in relation to the switching element, and wherein the rotational system includes second operative surfaces that, upon a movement of the switching element back from the end position to the central position, make contact with second slanting molded elements on the locking unit or second slanting molded elements on the switching element, thereby preloading second resilient rotational elements and rotating the locking unit in relation to the switching element by a second angular pitch.

The coupling according to the invention is thus to include a locking unit that locks a switching state in a manner that will be described below, or that makes a changeover process possible. To this end, however, the locking unit must assume different positions. Avoiding any need for using a separate actuator for this purpose, the locking unit is rotated by a rotational system, which is connected to the locking unit itself or a switching element, by the movement of the switching element that is generated by the actuator, if possible around the actuation axis of the switching element.

In a further embodiment of the invention, after a first movement of the switching element from the starting position to the end position and back to the central position, the switching element assumes a first relative position in the circumferential direction in relation to the switching element in which, in the central position, the switching element makes contact in the axial operative direction with a locking unit stop on the locking unit. The locking unit further includes second positive-locking retaining elements, and the switching element also has second positive-locking retaining elements that are engaged with each other in this central position fixing this first relative position in place in the circumferential direction.

With a first actuation of the actuator, the actuator acts, applying a force on the switching element, such that the switching element is moved against the force of the elastic actuation element in the axial direction from the starting position thereof and as far as an end position, and the locking unit is rotated therein by a first angular pitch. The actuator is then deactivated, and the elastic actuation element returns the switching element to the central position. The locking unit is therein rotated by a second angular pitch. The locking unit is now in a relative position in relation to the switching element that the switching element is in contact by a switching element stop thereof with a first locking unit stop of the locking unit. This way, any further movement by the switching element in the direction of the starting position is locked. Second positive-locking retaining elements on the locking unit and on the switching element prevent that this relative position changes inadvertently in the circumferential direction between the locking unit and switching element, for example due to vibrations occurring in the switchable coupling.

To ensure that, following re-activation of the actuator, the switching element can be moved to the starting position, the locking unit includes locking grooves. Following a second movement of the switching element from the central position as far as to the end position and back to the central position, the locking unit assumes a second relative position in relation to the switching element in the circumferential direction in which, starting from the central position, the switching element with all of the molded elements thereof is able to glide, without impediment, through the locking unit grooves in the locking unit, specifically as far as to the starting position in which the switching element makes contact with the starting stop. Furthermore, the locking unit includes third positive-locking retaining elements of the locking unit, and the switching element includes third positive-locking retaining elements of the switching element that, in this second relative position, are engaged with each other in each axial position of the switching element between the central position and the starting position, whereby they fix said relative position in place in the circumferential direction.

To ensure that after each actuation of the actuator and the thus resulting movement of the switching element to the end position, subsequently followed by the return movement to the central position, and that, after the actuator has been switched off, the first, and second positions are alternating between the switching element and the locking unit in the circumferential direction, it is envisioned according to the invention to offset the first relative position and the second relative position between the switching element and the locking unit by an angular pitch, respectively, in the circumferential direction, and in that the first angular pitch and the second angular pitch result together in this overall angular pitch, and in that this overall angular pitch is an even-numbered angular pitch of 360°. Preferably, the first angular pitch and the second angular pitch are of equal sizes, thereby each constituting half the size of the overall angular pitch.

The cyclical rotation of the locking unit in relation to the switching element occurs due to a first partial rotation by the first angular pitch, when the switching element moves from the central position to the end position, and due to a second partial rotation by the second angular pitch, when the switching element moves from the end position to the central position. To prevent that the locking unit performs a reverse rotation by the same second angular pitch after the second partial rotation, when the switching element moves next from the central position to the end position, it is provided according to the invention that, when the switching element is located in the central position, the first operative surfaces of the rotational system are disengaged from the switching element or the locking unit, whereby the first resilient rotational elements are relaxed. To prevent that the locking unit performs a reverse rotation by the same first angular pitch after the first partial rotation, when the switching element moves next from the end position to the central position, it is provided according to the invention that, when the switching element is located in the end position, the second operative surfaces of the rotational system are disengaged from the switching element or the locking unit, whereby the second resilient rotational elements are relaxed.

A geometric requirement for the correct cyclical rotation is, furthermore, that the overall angular pitch between the first positive-locking retaining elements and the second positive-locking retaining elements on the switching element, minus the offset angle between the first positive-locking retaining elements and the second positive-locking retaining elements on the locking unit, plus the first angular pitch or minus the second angular pitch is a whole-numbered multiple of the angular pitch between the first relative position and the second relative position.

Finally, it is also envisioned according to the invention that, when the switching element is located in the end position, first positive-locking retaining elements on the locking unit are engaged with first positive-locking retaining elements on the switching element fixing in place in the circumferential direction the relative position of the switching element and the locking unit in this switching position. By the different retaining elements it is ensured that, following rotations by certain angular pitches and during the relaxing of the resilient rotational elements, the locking unit does not inadvertently change position in relation to the switching element, for example due to oscillations and vibrations in the switchable coupling.

The invention is not limited to the characteristics of the associated claims. Possibilities involving combinations of individual characteristics of claims and combinations of individual characteristics of claims with the information as to advantages and disclosures in the embodiments are conceivable and envisioned. The invention also relates particularly to solutions that operate in the manner of the prior art, some of which have already been described previously in the embodiments.

Three embodiments of the switchable coupling according to the invention will be described below in an exemplary manner on the basis of FIGS. 1 to 20 and explained in terms of the arrangement of the elements of the coupling and the related functionalities thereof. FIGS. 1 to 12 therein relate to a first embodied variant involving a tooth clutch and friction clutch that will presently be described in special detail.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows further details of the first embodied variant.

FIG. 3 shows details regarding the switching element and the rotational system of FIG. 1 connected thereto.

FIG. 12 shows a sequence of the relative positions between switching element, locking unit and rotational system of FIG. 1 in the adjustment from the starting position to the locked central position.

FIGS. 13 to 16 refer to a second embodied variant of the switchable coupling according to the invention with tooth clutch and stop teeth, wherein:

FIG. 13 shows a full sectional view of the second embodied variant for an identification of the components;

FIG. 14 shows further details of the second embodied variant;

FIG. 15 shows a representation, in principle, regarding the manner in which the switching element, locking unit and rotational system of the second embodied variant engage with each other;

FIG. 16 shows a sequence of the relative positions between the switching element, locking unit and rotational system of the FIG. 13 embodiment in the adjustment from the locked central position to the starting position.

FIGS. 17 to 20 refer to a third embodied variant of the switchable coupling according to the invention with two-sidedly acting friction clutch, wherein:

FIG. 17 shows a full sectional view of the third embodied variant for an identification of the components;

FIG. 18 shows further details of the third embodied variant;

FIG. 19 shows a schematic representation of how the switching element, locking unit and rotational system of the third embodied variant engage with each other;

FIG. 20 shows a sequence of the relative positions between switching element, locking unit and rotational system of the FIG. 17 embodiment in the adjustment from the locked central position to the starting position.

DETAILED DESCRIPTION OF THE DRAWINGS

Figure 1:
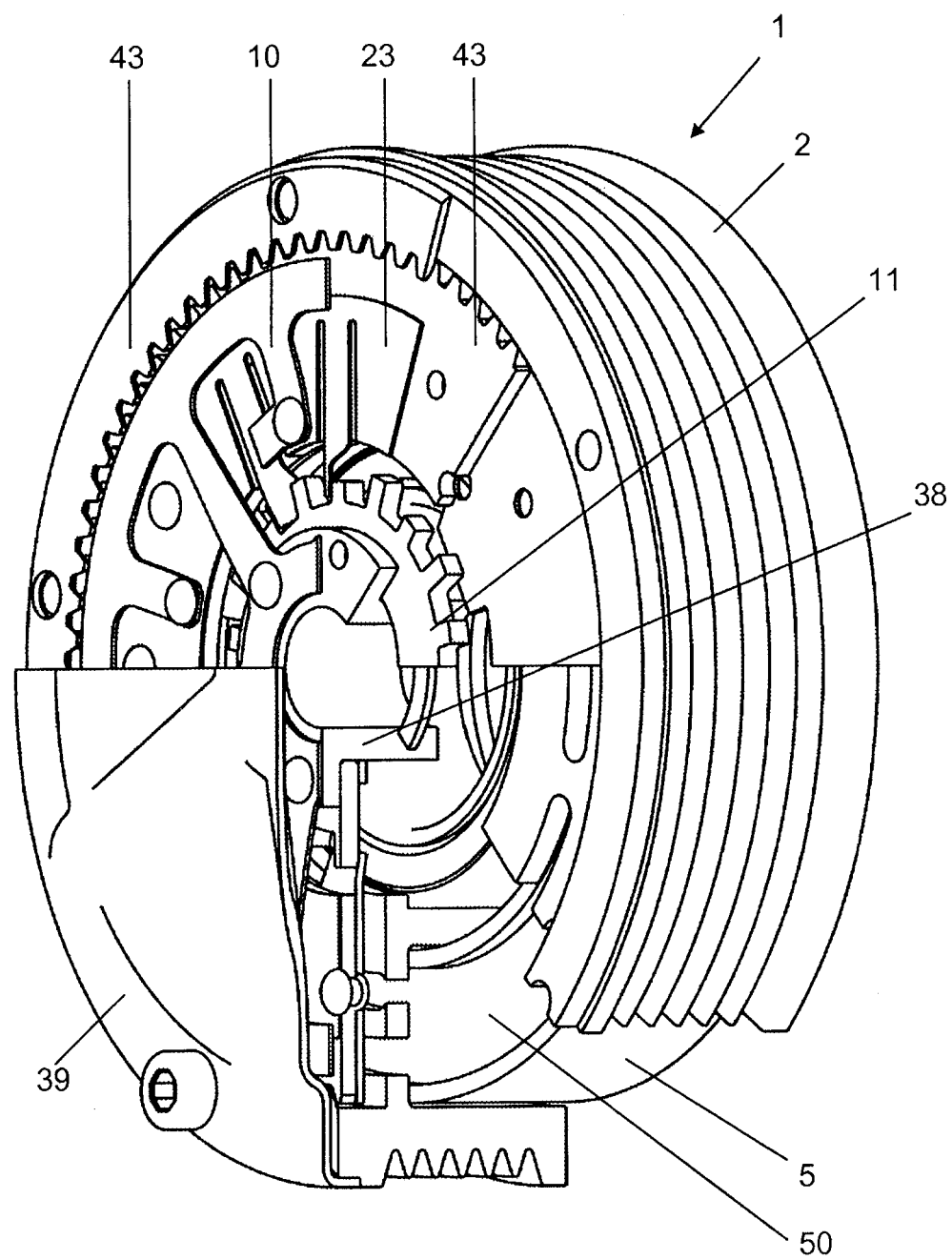
FIG. 1 shows an overall representation including initial details of the first embodied variant of the switchable coupling according to the invention.

FIG. 1 shows a first embodiment of the switchable coupling 1 according to the invention. The coupling operates presently between a driving element 2 that is embodied as a pulley and an output element 3 that is embodied as an output shaft. FIG. 2 shows the same embodied variant by way of a schematic representation of the related principle in order to further clarify the arrangement of the components, as well as how the engage with each other.

This switchable coupling 1 can be used in this form for powering in a switchable manner, for example, a climate compressor in a motor vehicle. To lower fuel consumption, the possibility of coupling a climate compressor to the pulley drive for powering secondary units must only be available if needed. In many operational situations, it is possible, however, to switch the climate compressor off and deactivate the same with opened coupling. The switchable coupling shall be configured such therein that said coupling must only be actively actuated with auxiliary energy during changeover operations, after which the coupling is able to maintain itself in the two switching states of "coupling=open" and "coupling=closed."

The switchable coupling 1 contains a solenoid 50 that functions as an actuator 5. A hydraulic actuator having the same direction of force is alternately possible. The actuator 5 is seated in a housing 0 that has the driving element 2 supported thereupon.

The coupling system 4 of this switchable coupling contains on the one side, seen in FIG. 2 on the left side, a friction clutch for synchronizing the driving element 2 and the output element 3 and on the other side, seen in FIG. 2 on the right side, a tooth clutch for permanently coupling the driving element 2 and the output element 3 without further loads for the actuator. These two coupling parts are principally known from the prior art.

The friction clutch, seen in FIG. 2 on the left side, comprises a clutch disc 40 that is fixedly connected to the driving element 2 and a friction disc 41 associated with the switching element 6. The tooth clutch, seen on the right side in FIG. 2, comprises switching teeth 42 that are fixedly connected to the driving element 2 and a coupling sleeve 43 that is connected to the switching element 6.

The switching element 6, which is made up of a plurality of single parts that are fixedly connected to each other, is axially movable inside the switchable coupling and able to transfer torque to the output element 3 in all axial positions. An elastic actuating element 10 is provided for this purpose, as seen in FIG. 2, that is made of a punched spring plate 45 in this embodied variant, as depicted in detail in FIG. 6, and which is fixedly connected to the switching element 6 by retaining arms 46 that are in connection with the exterior edge 47. On the interior edge 48, it is connected to the sleeve support 38, which is, via a toothed shaft connection, in a torque-proof engagement with the output element 3 and which is held in the axial direction by snap rings or, alternately, by a screwed connection on the output element 3. The two edges 47 and 48 of the spring plate 45 are connected to each other by elastic spokes 49.

The elastic actuating element 10 applies an axial force on the switching element 6, as seen in FIG. 2 toward the right, that presses the coupling sleeve 43 in the direction of engagement with the switching teeth 42. The force by the preferably magnetic actuator 5 counteracts this force and pulls the friction disc 41 against the clutch disc 40.

Figures 8A, 8B, 8C:
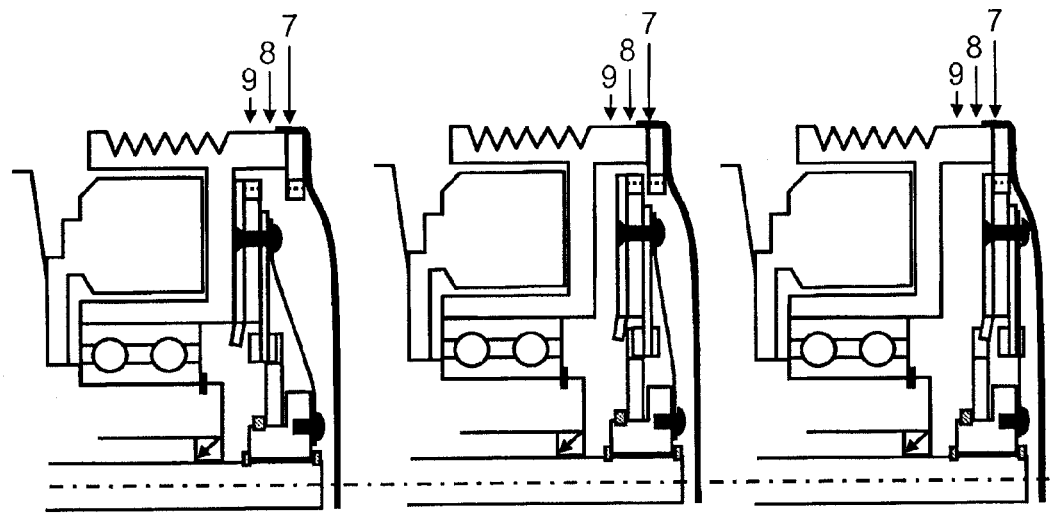
FIG. 8 shows the switchable coupling of FIG. 1 in the starting, central and end positions.

FIGS. 8a to 8c depict this switchable coupling 1 in three different switching positions 7, 8 and 9 that differ in terms of the axial positions of the switching element 6 and the state of deformation of the elastic actuating element 10. In FIG. 8a, the actuator 5 pulls the switching element 6 against the axial force of the elastic actuating element 10 toward the left as far as end position 9, such that the friction clutch is active. In FIG. 8b, the switching element 6 is in a central position 8 thereof in which neither the friction clutch nor the tooth clutch are active. In FIG. 8c, the switching element 6 is in starting position 7 in which the tooth clutch is closed, and a torque is transmitted from the driving element 2 via the switching teeth 42 and the coupling sleeve 43, the elastic actuating element 10 and the sleeve support 38 to the output element 3.

With the characteristics of the switchable coupling 1 according to the invention, the object is achieved that, by an initial activation of the actuator 5, the switching element 6 is moved from the central position 8 into the end position 9, and after the deactivation of the actuator 5, the return movement of the switching element 6 is made possible by the axial force from the elastic actuating element 10 to the starting position 7. With the next activation of the actuator 5, the switching element 6 is first moved into the end position 9 again to limit thereafter, after the deactivation of the actuator 5, the movement of the switching element 6 back to the central position 8.

Figure 10:
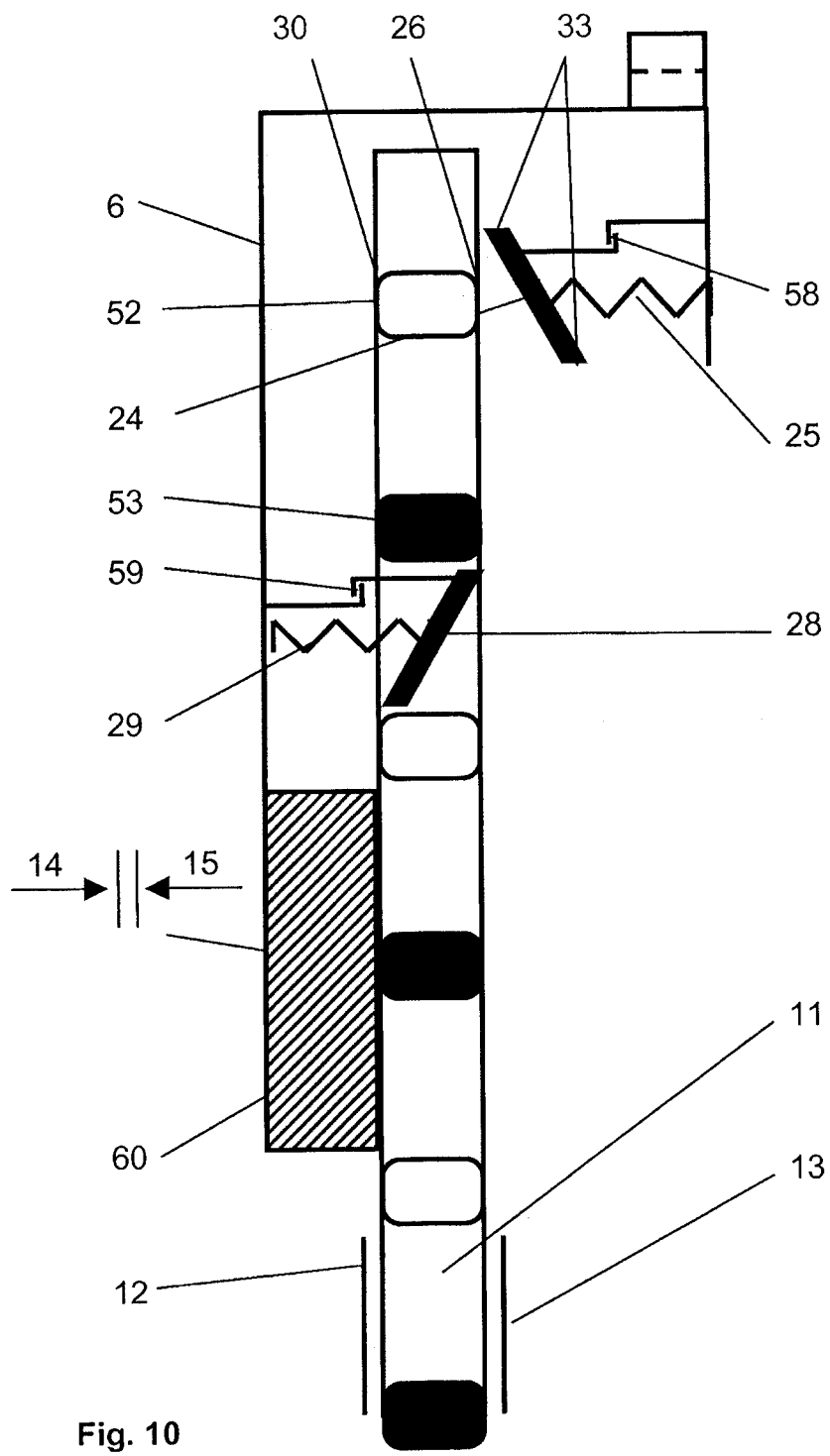
FIG. 10 shows further details of the switching element, locking unit and rotational system of the first embodied variant and of how these parts engage with each other.

A locking unit 11 is provided to this end, as seen in FIG. 2, that can be rotated in the circumferential direction and that is held on the sleeve support 38, as can be seen in FIG. 10, in the axial direction by a first stop 12 and a second stop 13.

By the repeated axial movement of the switching element 6 due to the activation of the actuator 5, and by a rotational system 23 that is connected to the switching element 6 in this embodied variant, the locking unit is rotated in a cyclical sequence into such relative positions 16 and 18 in relation to the switching element 6 that, on the one hand, the axial movement of the switching element 6 is limited in the central position 8 due to the axial force from the elastic actuating element 10, and in that, with the next time, the axial movement of the switching element 6 is possible as far as to the starting position 7.

Figure 4:
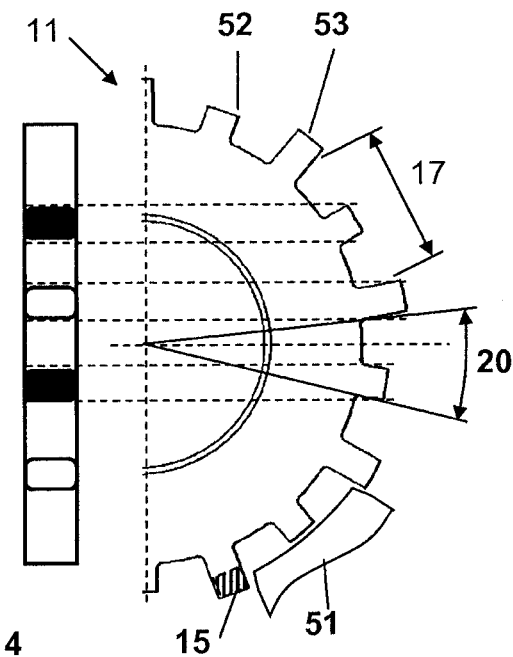
FIG. 4 shows further details regarding the locking unit of FIG. 1.

To achieve this, the locking unit has, as depicted in FIG. 4, a plurality of short locking unit teeth 52 and a plurality of long locking unit teeth 53, wherein the short locking unit teeth 52 are offset in relation to the long locking unit teeth 53 by an angular pitch 20, respectively. The long locking unit teeth 53 therein protrude in the radial direction somewhat further from the base body of the locking unit 11 and constitute on the front side a locking unit stop 15, respectively. The switching element 6 is able to make contact against these locking unit stops 15 by way of the switching element stops 14 to thereby limit the movement of the switching element 6 in the central position 8. As shown in FIG. 3, in this embodied variant, said switching element stops 14 are located on radial, internally directed stop teeth 51 on the friction disc 41 that is connected to the switching element 6.

Figures 5A, 6:
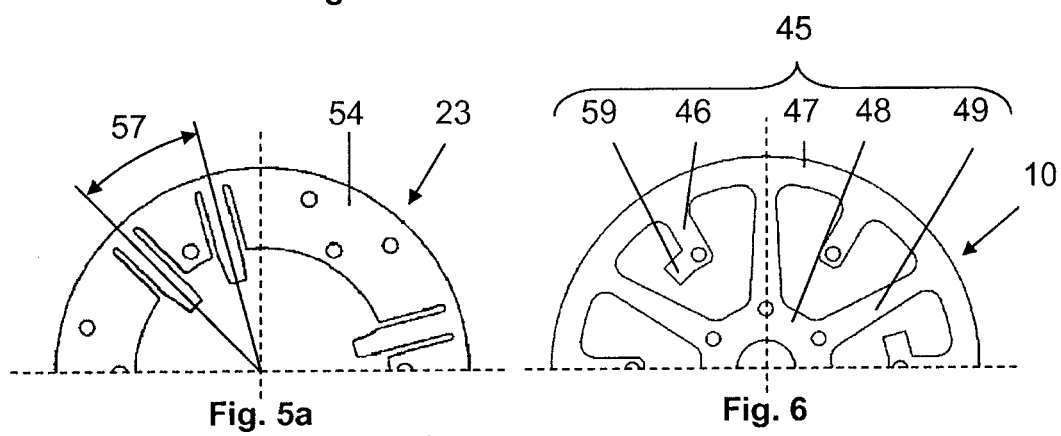
FIG. 6 shows further details regarding the elastic actuating element of FIG. 1.
Figure 5B:
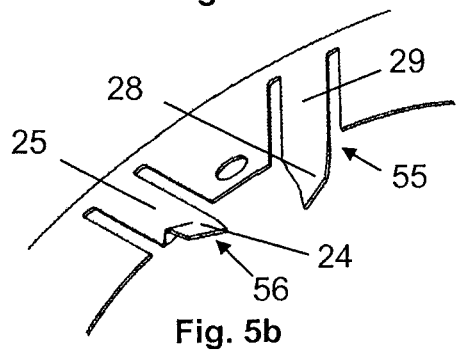
FIG. 5 shows further details regarding the switching system of FIG. 1

FIGS. 3, 5 and 10 depict details of rotational system 23 that is connected in this embodied variant to the switching element 6. The main element of the rotational system 23 is an elastic rotator 54, as depicted in FIGS. 5a and 5b, having a plurality of spring tongues 55 connected thereto as resilient rotational elements 25 and 29, as well as having beveled end pieces 56 as supports of the operative surfaces 24 and 28 of the rotational system 23. The spring tongues 55 for the resilient rotational elements 25 with slanting operative surfaces 24 are disposed in relation to the spring tongues 55 for the resilient rotational elements 29 with slanting operative surfaces 28 offset in the circumferential direction by an angular pitch of the operative surfaces 57. The beveled end pieces 56 with the operative surfaces 24 of the rotational system 23 and the beveled end pieces 56 with the operative surfaces 28 of the rotational system 23 are inclined in the opposite direction in relation to the main plane of the rotator 54.

FIGS. 9 to 12 demonstrate the engagement of the rotational system 23 that is connected to the switching element 6 with the locking unit 11. These figures are functional representations of the switching element 6 together with the elastic rotator 54 connected thereto including the spring tongues 55 and end pieces 56 thereof, specifically as a U-shaped part with resilient rotational elements 25 and 29 connected thereto, as well as operative surfaces of the rotational system 24 and 28. The locking unit 11 is guided between the axial stops 12 and 13. The locking unit teeth 52 and 53 with different tooth lengths are visible on the locking unit as sketched and filled elements, respectively, as seen also in FIG. 4.

Figures 9A, 9B, 9C:
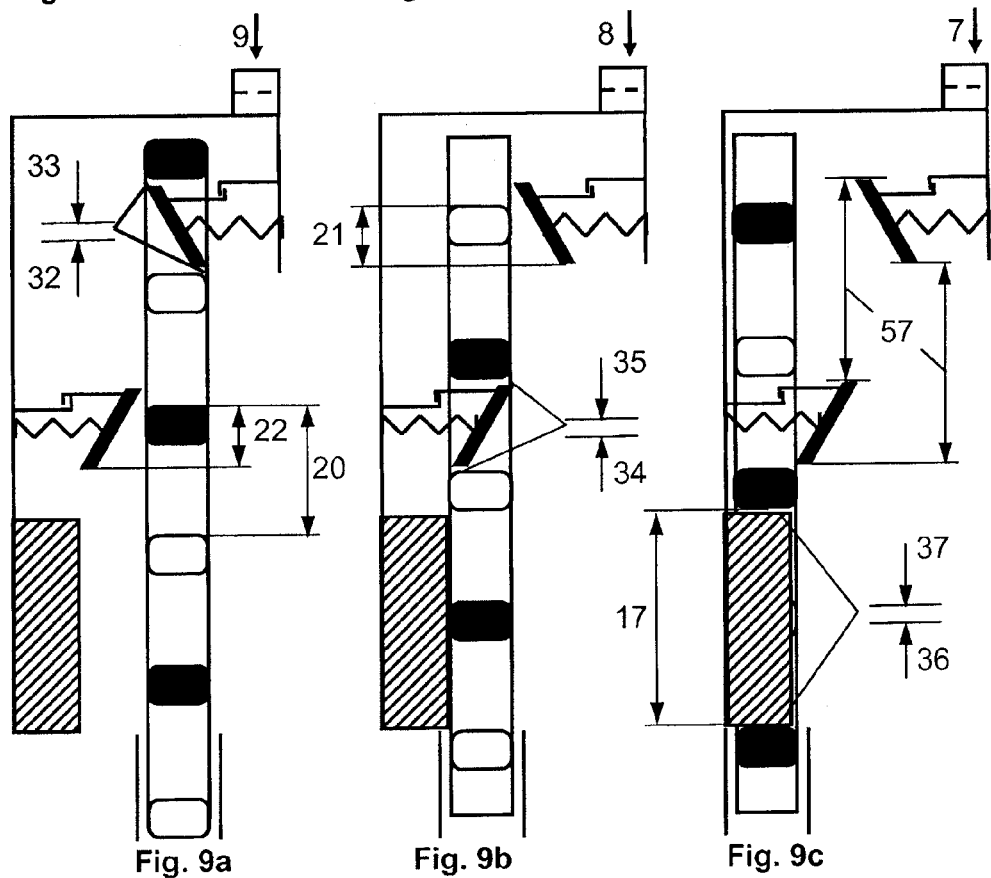
FIG. 9 shows a schematic representation of the switching element of FIG. 1 complete with rotational system in relation to the locking unit in the starting, central and end positions.

In FIGS. 9b and 10, the switching element 6 is located with the rotational system 23 in the central position 8. The switching element 6 presses by the switching element stop 14 in front of the locking unit stop 15 against a long locking unit tooth 53, thereby preventing disengagement of the switching element in the starting position 7. The resilient rotational elements 29 with the slanting operative surfaces 28 are inserted with zero force in the locking unit grooves between two locking unit teeth 52 and 53. These locking unit teeth constitute herein second positive-locking retaining elements 34 on the locking unit that are engaged in this position with second positive-locking retaining elements 35 on the switching element, and which are formed in the present embodied variant by the front faces of the slanting end pieces for the operative surfaces 28. The elastic rotational elements 25 with the slanting operative surfaces 24 are located with zero force from the other side outside of the locking unit 11, presently in front of a short locking unit tooth 52.

FIGS. 9a and/or 9c depict the engagement situations between the switching element 6 with the rotational system 23 and the locking unit 11 in the end position 9 of the switching element 6 and/or in the starting position 7 of the switching element.

Figure 11A:
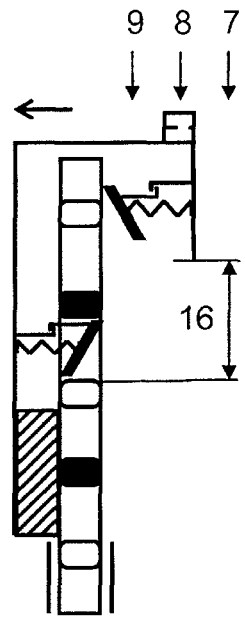
FIG. 11 shows a sequence of the relative positions between switching element, locking unit and rotational system of FIG. 1 in the adjustment from the locked central position to the starting position.
Figure 11B:
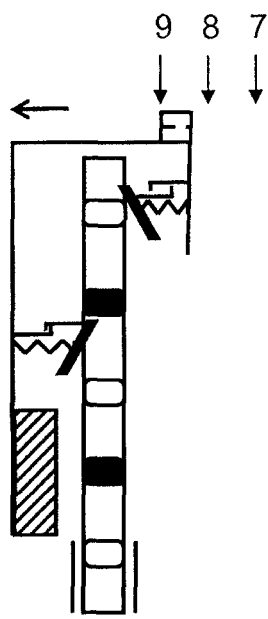

FIGS. 11a to 11f show the sequence of the relative positions between the switching element 6 with the rotational system 23 and the locking unit 11 between the axial stops thereof. In FIG. 11a, the switching element 6 is in the central switching position 8, in the same manner as in FIGS. 9b and 10. Following activation of the actuator 5, the switching element 6 is moved to the left against the force from the elastic actuating element 10 until, as seen in FIG. 11b, the slanting operative surfaces 24 on the resilient rotational elements 25 make contact with locking unit teeth, presently short locking unit teeth 52. The resilient rotational elements 29 with the slanting operative surfaces 28 are still engaged, as second positive-locking retaining elements 35 of the switching element 6, with the second retaining elements 34 that are constituted by the two neighboring locking unit teeth on the locking unit, specifically such that the forces from the slanting operative surfaces 24 are able to rotate the locking unit onto first slanting molded elements 26 on the locking unit 11, presently the edges on the short locking unit teeth 52, not yet in the circumferential direction, in FIG. 11 downward.

When the switching element 6 is moved further in the direction of the switching end position 9, further loads are applied to the resilient rotational elements 25. This also causes the lateral force upon the second positive-locking retaining elements 34 and 35 to increase. To be able to move the spring tongues (second resilient rotational elements 29 and second operative surfaces 28) that are connected thereto against the non-positive force in contact with and out with the locking unit teeth, these spring tongues are prevented from topping out by the axial stop 59 on the spring plates 45. FIG. 6 shows how the axial stops 59 for these spring tongues (29 and 28) are obtained by punching the same out of the spring plate 45 for the elastic actuating element 10.

Figure 11C:
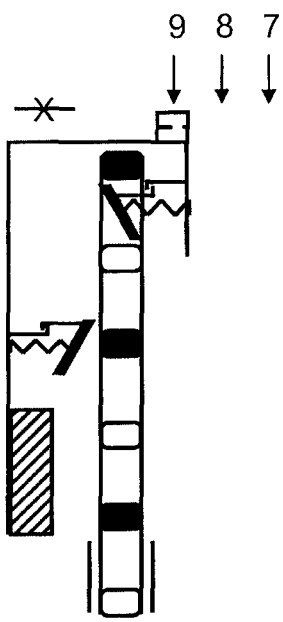

FIGS. 11c and 9a show how the switching element 6 has been moved by the force from the actuator 5 as far as end position 9. The resilient rotational elements 29 thereof with the slanting operative surfaces 28 have been completely disengaged from the locking unit 11. The forces on the previously preloaded resilient rotational elements 25 can now engage in such a manner via the slanting operative surfaces 24 on the slanting molded elements 26 on the locking unit, presently on the short locking unit teeth 52, that the locking unit is rotated downward in the circumferential direction by a first angular pitch 21, as shown in FIG. 11c. This way, it is possible for the resilient rotational elements 25 to engage together with the operative surfaces 24 completely between two locking unit teeth 52 and 53. The front faces of the slanting end pieces for the operative surfaces 24 constitute herein the first positive-locking retaining elements 33 on the switching element 6, and the locking unit teeth constitute the second positive-locking retaining elements 32 on the locking unit that engage in this axial relative position such with each other that the locking unit 11 cannot be moved any further in the circumferential direction.

As geometric requirement for achieving the correct contact between the operative surfaces 24 of the rotational system 23 that is connected to the switching element 6 and the slanting molded elements 26 on the locking unit, in this embodied variant, the angular pitch 57 is between the first positive-locking retaining element 33 and the second positive-locking retaining element 35 on the switching element 6, plus the first angular pitch 21 or minus the second angular pitch 22 a whole-numbered multiple of the angular pitch 20 between the relative positions 16 and 18. To be taken into account therein is the fact that the offset angle 44 between the first positive-locking retaining elements 32 and the second positive-locking retaining elements 34 is zero at the locking unit 11, because they are formed by coaxial grooves in the locking unit.

Figure 7:
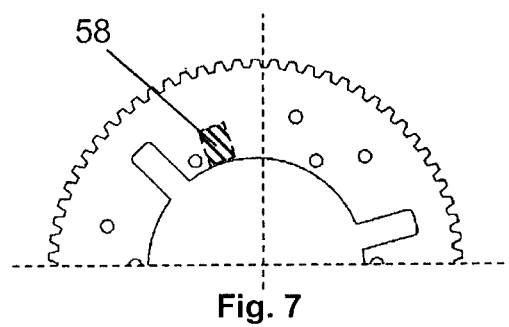
FIG. 7 shows the position of a stop for the elastic actuating element on the switching element of FIG. 1.
Figure 11D:
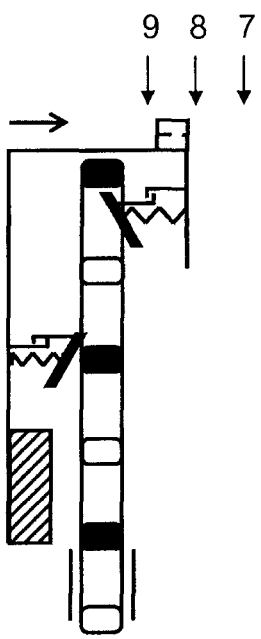

When the actuator 5 is deactivated, only the force from the elastic actuating element 10 acts on the switching element 6 in the axial direction in order to move the switching element 6 in the direction toward the starting position 7. FIG. 11d demonstrates that it is possible therein to extract the previously relaxed first resilient rotational elements 25 by an axial stop 58 at the coupling sleeve 43, and without further topping out, from the locking unit 11. This stop 58 is, as depicted in FIG. 7, a contact surface on the coupling sleeve 43.

The second operative surfaces 28 of the rotational system 23 that are connected to the second resilient rotational elements 29 come into contact with two slanting molded elements 30 on the locking unit during this movement of the switching element 6, specifically the long locking unit teeth 53 of the locking unit, and they are preloaded therein. To allow the resilient rotational elements sufficient spring deflection, the, in the present embodied variant, the neighboring coupling sleeve has localized cutouts, which are discernable in FIGS. 3b and 7.

The resilient rotational elements 25 with the slanting operative surfaces 24 and the correspondingly formed first positive-locking retaining elements 33 on the switching element are still in lateral contact with the first positive-locking retaining elements 32 on the locking unit 11, specifically in such a manner that the forces from the slanting operative surfaces 28 on the slanting molded elements 30 on locking unit 11 are not yet able to rotate the locking unit in the circumferential direction, in FIG. 11d downward. When moving the switching element 6 further in the direction of the switching starting position 7, the resilient rotational elements 29 are loaded further. This also causes the lateral force on the first positive-locking retaining elements 32 and 33 to increase.

Figure 11E:
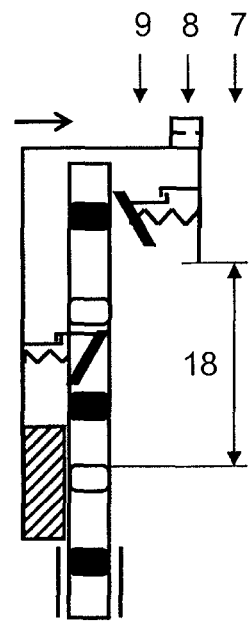
Figure 11F:
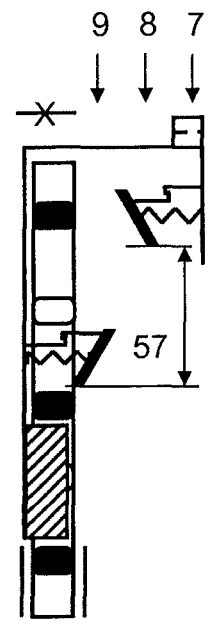

As soon as, as demonstrated in FIG. 11e, the spring tongues with the slanting end pieces for the operative surfaces 24 and the second positive-locking retaining elements on the switching element 35 have been disengaged from the locking unit 11 completely, the force from the slanting operative surfaces 28 on the second slanting molded elements 30 on the locking unit 11, presently on the long locking unit teeth 53, can rotate the locking unit 11 in the circumferential direction, in FIG. 11e downward, further by a second angular pitch 22 until the slanting end pieces with the operative surfaces 28 and the first positive-locking retaining elements 33 have been engaged once again completely in the locking unit grooves between two locking unit teeth. In this relative position 18 between the switching element 6 and the locking unit 11, the switching element 6 does not make contact by the switching element stop 14 on the stop tooth 51 with the locking unit stop 15 on a long locking unit tooth 53; instead it overruns the short locking unit teeth 52 and moves through a locking unit groove 17 that is formed by two neighboring long locking unit teeth (see FIG. 4), such that the switching element 6 can be pulled as far as the starting position 7 by the elastic actuating element 10. The slanting end pieces therein with the operative surfaces 28 and the first positive-locking retaining elements 33 are disengaged once again from the locking unit 11. To avoid any inadvertent further rotation of the locking unit 11 in the circumferential direction in relation to the switching element 6, the switching element 6 has third positive-locking retaining elements 37, presently in the form of a retaining tab 60, on the rotational system 23 that is connected to the switching element 6, and which engages in this switching state between two long locking unit teeth 53, presently constituting third positive-locking retaining elements 36 on the locking unit. In the alternative to the retaining tab 60, a holding fork could also comprise one of the locking unit teeth.

In the starting position 7, the movement of the switching element 6 is limited by a stop 19, as seen in FIG. 2, that is seated on a cover plate in this embodied variant 39, which encloses and protects the switchable coupling 1.

FIGS. 12a to 12f demonstrate the sequence of switching positions, when the switching element 6 is moved once again, by activation of actuator 5, from the starting position 7 into the end position 9. The locking unit 11 is rotated therein by a first angular pitch 21. Following deactivation of the actuator, only the force of the elastic actuating element 10 is in effect in the axial direction acting on the switching element 6 pulling the same back in the direction of the starting position 7. The locking unit 11 therein is rotated still further by a second angular pitch 22, such that the switching element 6 with the switching element stops 14 on the contact teeth 51 makes contact again with the locking unit stops 15 on the long locking unit teeth 53. This causes the movement of the switching element 6 to be limited again in the central position 8.

Figure 13:
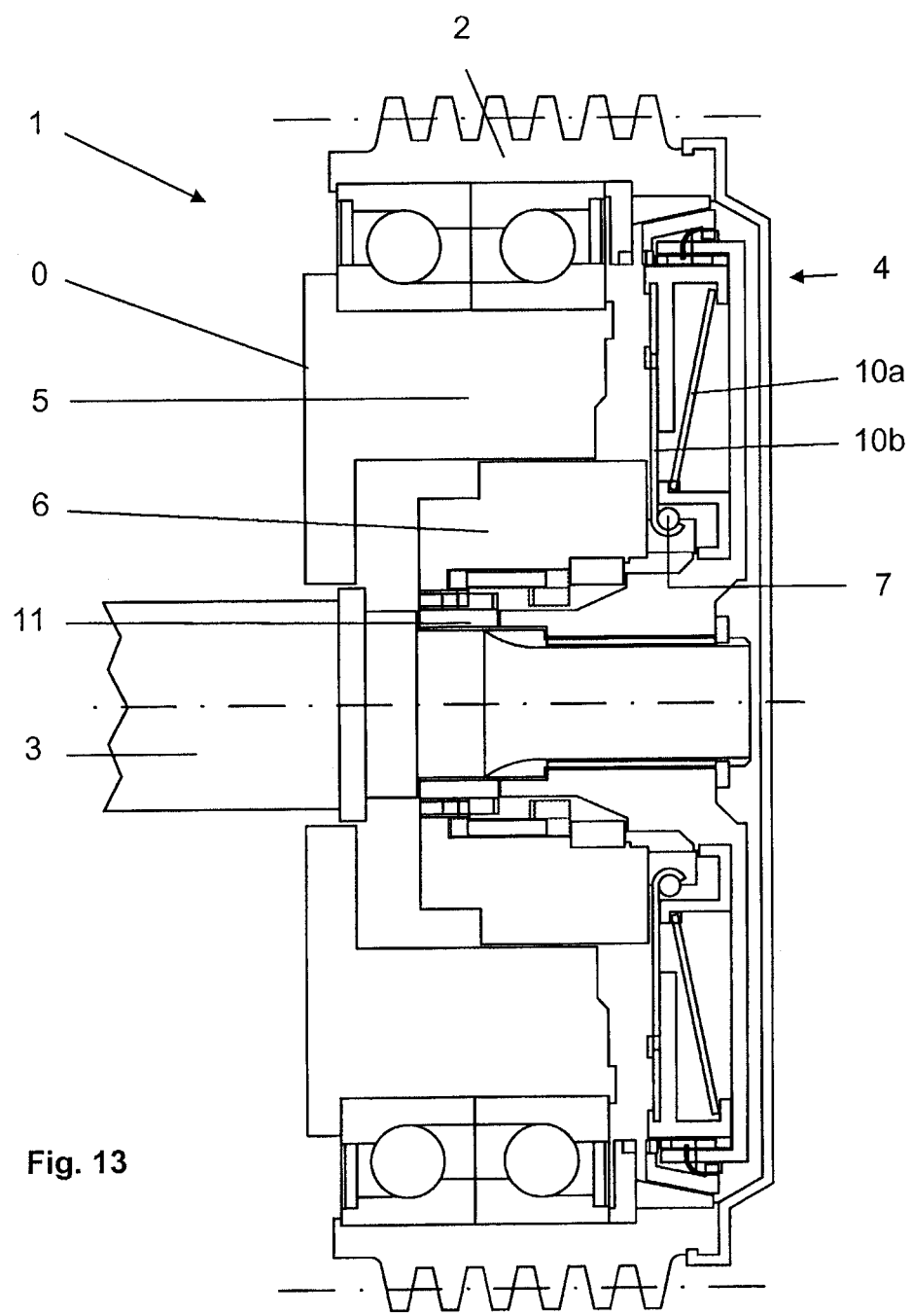
Figure 14:
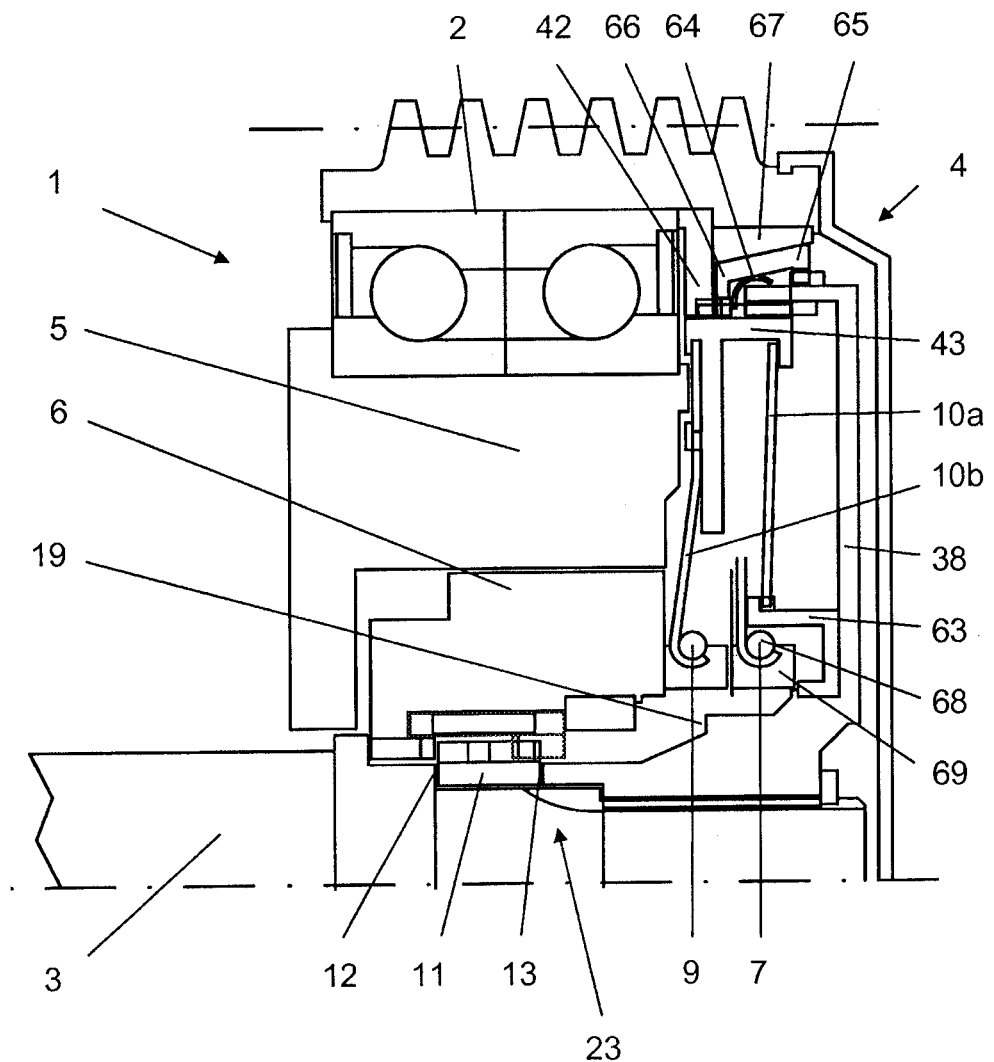

FIG. 13 depicts a second embodiment of the switchable coupling 1 according to the invention. In this instance as well, the coupling is in effect between a driving element 2 that is configured as a pulley and an output element 3 that is configured as an output shaft. FIG. 14 shows further details of this embodied variant. The switchable coupling 1 presently also has an actuator 5, which is preferably a solenoid 50. Alternately, a hydraulic actuator is also possible. The actuator is seated here too inside a housing 0 upon which the driving element 2 is supported, as before. The coupling system 4 of this switchable coupling contains a tooth clutch with stop teeth, as known, as a matter of principle, from manual gear shift systems in passenger cars. FIG. 13 represents the coupling system in the switching position "coupling=open." The switching element 6 of this embodied variant is in the starting position 7. To maintain the coupling in the starting position 7, as shown in FIG. 13, the coupling has a first elastic actuation element 10a in form of a slotted disc spring, which, as shown in FIG. 14, presses the coupling sleeve 43 against the sleeve support 38, supporting itself therein on a spring support 63. The sleeve support 38 is engaged with the output element 3 via a toothed shaft connection, and it is held in the axial direction by a snap ring (alternately, a screwed connection). A second elastic actuating element 10b is fastened, preloaded, on the coupling sleeve 43, also in form of a slotted disc spring. This second elastic actuating element 10b engages by the slotted ends thereof a retaining ring 68 that is snapped into place in grooves of a plurality of retaining noses 69 on the switching element 6. The switching element 6 extends into the inside diameter of the actuator 5. When the actuator 5 is activated, the switching element 6 in FIGS. 13 and 14 is moved to the left, thereby loading the elastic actuating elements 10a and 10b.

FIG. 14 depicts the upper half of the switchable coupling in the end position 9. To clarify the functionality, the connecting point between the second elastic actuating element 10b and the switching element 6 is also shown, once more, in the starting position 7. In the starting position 7, the first elastic actuating element 10a is maximally relaxed, and the second elastic actuating element 10b rests preloaded against the coupling sleeve 43. This embodied variant of the coupling according to the invention is in the switching state "coupling=open." By activating the actuator 5, the switching element 6 is moved to the left as far as the switching end position 9. On the way from the starting position 7 to the end position 9, the first elastic actuating element 10a is deformed first, because the second elastic actuating element 10b rests against the coupling sleeve 43 until the preloading force has been reached. The coupling sleeve 43 is moved to the left therein. It takes the synchronizer ring 65 with the stop teeth 66 along, for example by three spring plates 64 that are distributed along the circumference of the coupling sleeve 43. As soon as the synchronizer ring 65 touches a friction cone 67 on the driving element 2, the synchronizer ring 65 rotates, by a few angular degrees within the play, which provides it with the possibility of a corresponding groove in the sleeve support 38, then reaching the locked position. In said locked position, the actuating force of the switching element 6 in effect via the elastic actuating elements 10a, 10b and the coupling sleeve 43, pressing the same in front of the synchronizer ring 65 and the latter against the friction cone 67. The result is a synchronization torque that synchronizes the components on the output side to the torque of the components on the driving side. As soon as synchronous speeds of the friction cone 67 and the synchronizer ring 65 have been reached, the synchronization torque between these components disappears. The coupling sleeve 43 is now able, by way of the beveled stop teeth, to rotate the synchronizer ring 65 somewhat backwards and glide through the stop teeth 66. Afterwards it encounters the switching teeth 42 that rotate at the same speed and engages therein. The switching element 6 is then located in the central position 8.

After locking the coupling sleeve 43 in the switching teeth 42, the switching element 6 is moved still further to the left, as far as end position 9. The actuating force that is needed for this purpose is greater than the preloading force of the second elastic actuating element 10b. This results in an elastic deformation of this second elastic actuating element 10b, and thereby an energy storage in this element.

During the axial movement thereof, the switching element 6 is in complex engagement with a locking unit 11 that is unable to move in the axial direction because it is seated with minimal play between the two axial stops 12 and 13.

Figure 15:
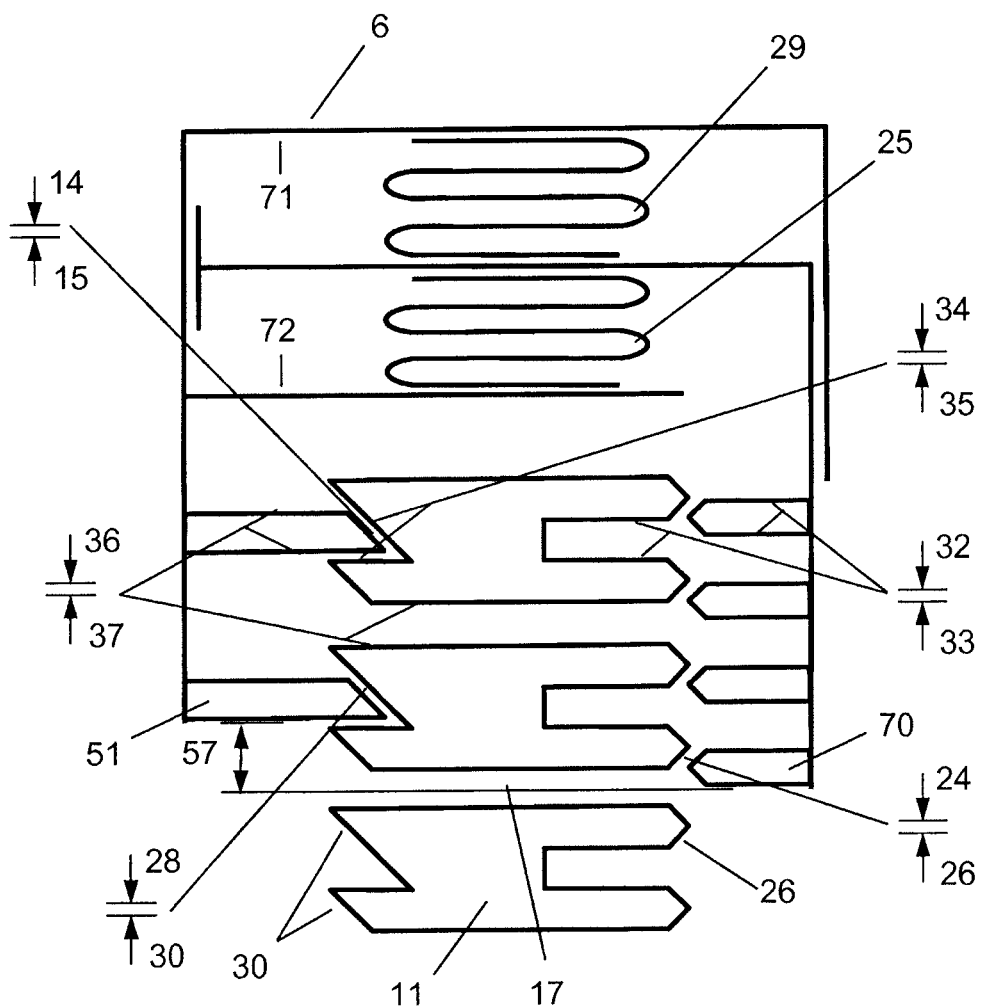

FIG. 15 illustrates the principle arrangement of the switching element 6, locking unit 11 and rotational system 23, which is elastically connected to the switching element 6 in this embodied variant. The switching element 6 has at least one guide groove that is oriented in the circumferential direction by a first stop 71 and a second stop 72. These stops limit the movement space of a toothed ring 70 of the rotational system 23. The toothed ring 70 is guided over the elastic spring elements 25 and 29 within the stops 71 and 72.

FIGS. 16a to 16f depict the sequence of the relative positions between the switching element 6 with the rotational system 23 and the locking unit 11 between the axial stops.

Figure 16A:
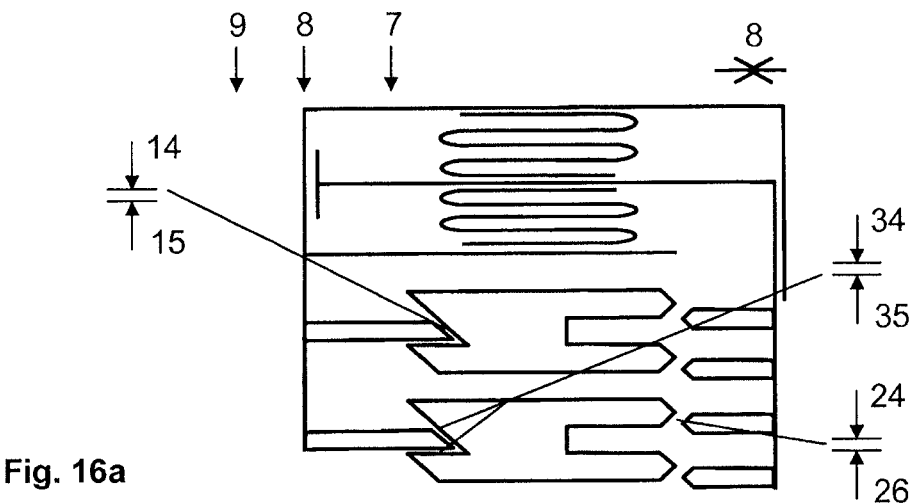
Figure 16B:
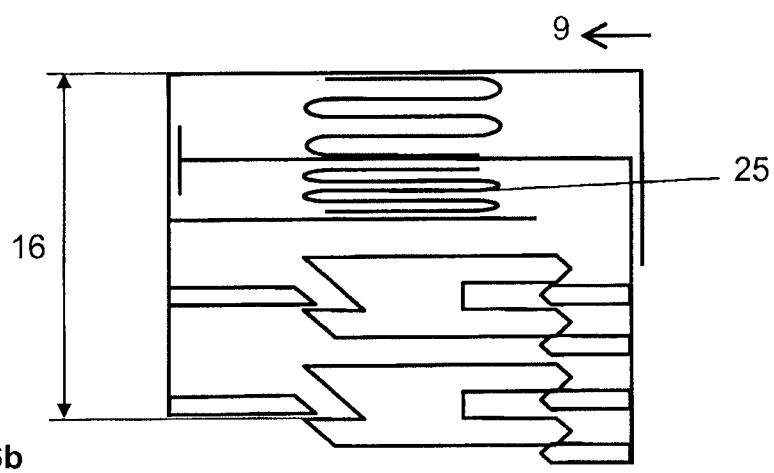

In FIG. 16a, as in FIG. 15, the switching element 6 is located in relation to the locking unit 11 in a first relative position 16 in the circumferential direction. In this relative position, the switching element 6 is only able to engage in the locking unit 11 as far as the central position 8, in which this embodied variant of the switchable coupling is in the state of "coupling=closed." In this central position 8, the switching element 6 makes contact with a switching element stop 14 on a locking unit stop 15 on the locking unit. The locking unit 11 has second positive-locking retaining elements 34 that are engaged in this central position 8 with second positive-locking retaining elements 35 at the switching element 6. The locking unit stop 15 and the second positive-locking retaining elements 34 on locking unit 11 are formed in part by the same operative surfaces on the locking unit 11. Similarly, the switching element stop 14 and the second positive-locking retaining elements 35 on the switching element 6 are formed in part by the same operative surfaces on the switching element 6. When the actuator 5 now moves the switching element 6 in relation to the locking unit in the direction of the end position 9, as seen in FIG. 16 toward the left, the first operative surfaces 24 of the rotational system 23 that is elastically connected to the switching element 6 make contact with the first slanting molded elements 26 on locking unit 11, preloading first resilient rotational elements 25. However, the switching element 6 is not yet able at this point to rotate in relation to the locking unit 11, because second positive-locking retaining element 34 are still engaged at the locking unit with second positive-locking retaining elements 35 on the switching element.

Figure 16C:
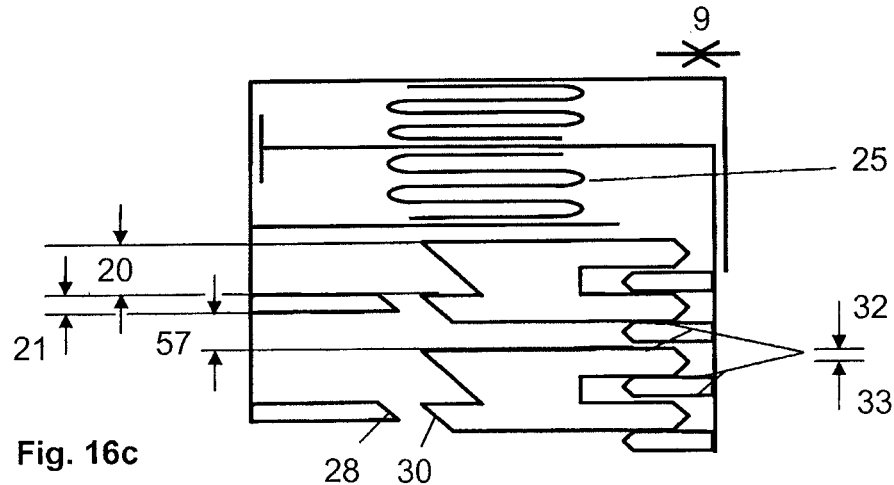
Figure 16D:
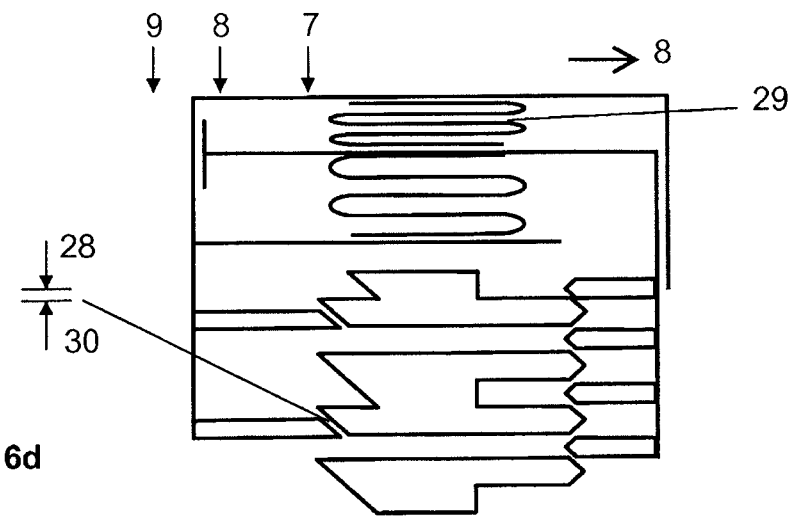
Figure 16E:
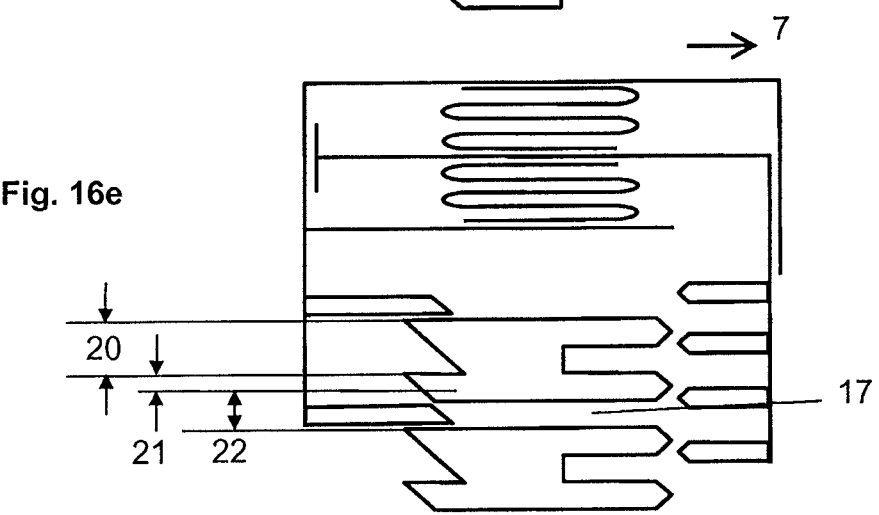
Figure 16F:
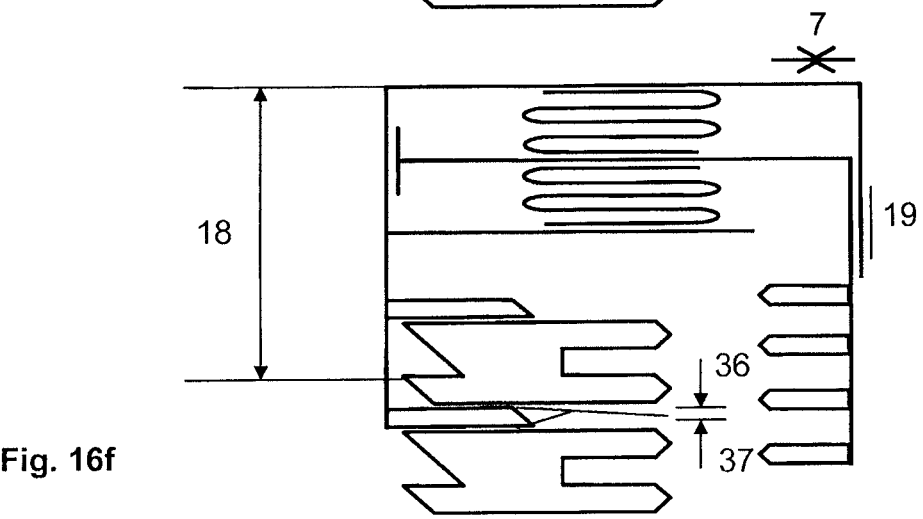

Only when, as seen in FIG. 16c, these second retaining elements are disengaged in the end position 9, the first resilient rotational element 25 is able to relax and thereby rotate the locking unit 11 in relation to the switching element 6 by a first angular pitch 21. After the rotation by this first angular pitch 21, first positive-locking retaining elements 32 on the locking unit, which are engaged then with the first positive-locking retaining elements 33 on the switching element, prevent any further inadvertent rotation. The geometric requirement for the correct contact between the operative surfaces 24 of the rotation system 23 that is connected to the switching element 6 and the slanting molded elements 26 on the locking unit is also in this embodied variant that the angular pitch 57 between the first positive-locking retaining elements 33 and the second positive-locking retaining elements 35 on the switching element 6, plus the first angular pitch 21 or minus the second angular pitch 22 is, once again, a whole-numbered multiple of the angular pitch 20 between the relative positions 16 and 18. To be considered as well is the fact that the offset angle 44 between the first positive-locking retaining elements 32 and the second positive-locking retaining elements 34 is zero at the locking unit 11, because the same are formed by coaxial grooves in the locking unit.

After the rotation around the first angular pitch 21, the switching element 6 and the locking unit 11 are located in a relative position, such that after deactivating the actuator 5 and, due to the forces from the elastic actuating elements 10a and 10b, the switching element 6 makes contact with second operative surfaces 28 of the rotational system 23 against second slanting molded elements 30 at the locking unit 11. With a further axial movement of the switching element 6 in the direction of the starting position 7, second resilient rotational elements 29 are preloaded and the locking unit 11 is rotated in relation to the switching element 6 by a second angular pitch 22 until the switching element 6 engages initially with second 35 then third positive-locking retaining elements 37 in initially second 34 then third positive-locking retaining element 36 on the locking unit 11. In this embodied variant, the second and the third retaining elements on the locking unit and on the switching element are constituted by the same operative surfaces. This distinction is only necessary in a comparison with the first embodied variant.

The switching element 6 and the locking unit 11 remain in this second relative position 18 until the switching element 6 makes contact in the starting position 7 with a stop 19 for the switching element in the starting position 7. In the present embodied variant, this stop 19 is implemented as a stop on the sleeve support 38 that is axially fixed in place in the switchable coupling 1. The third positive-locking retaining elements on locking unit 36 on the locking unit constitute simultaneously the locking unit groove 17, and through which the switching element 6 is able to glide together with all the molded elements thereof as far as the starting position 7. In this starting position 7, the switchable coupling in this embodied variant is in the switching position "coupling=open." In the starting position 7, the rotational system 23 is once again disengaged by the operating surfaces 24 thereof from the locking unit 11. The second resilient rotational elements 29 relax, and the rotational system 23 returns to a relative position in relation to the locking unit 11, where once again, when the switching element 6 moves in the direction of the end position 9, first operative surfaces 24 of the rotational system make contact with first slanting molded elements 26 on the locking unit.

In the next movement of the switching element 6 as far as the end position 9, which is initiated by the activation of the actuator 5, first, once again, the first resilient rotational element 25 is preloaded, and then the locking unit 11 is rotated in relation to the switching element by the first angular pitch 21, as soon as the end position 9 of the switching element 6 is disengaged from the locking unit 11 and the resilient rotational element 25 is able to relax again.

Following the deactivation of the actuator 5, the elastic actuating element 10 pulls the switching element 6 back in the direction of the starting position 7. The second operative surfaces 28 of the rotational system 23 therein make contact once again with the second slanting molded elements 30 on the locking unit 11, preloading the second resilient rotational elements 29 and rotating the locking unit 11 in relation to the switching element 6 once again by the second angular pitch 22. In the central position 8, the switching element once again makes contact by the switching element stops 14 with the locking unit stops 15 that limit the axial movement of the switching element in the central position 8.

Figure 17:
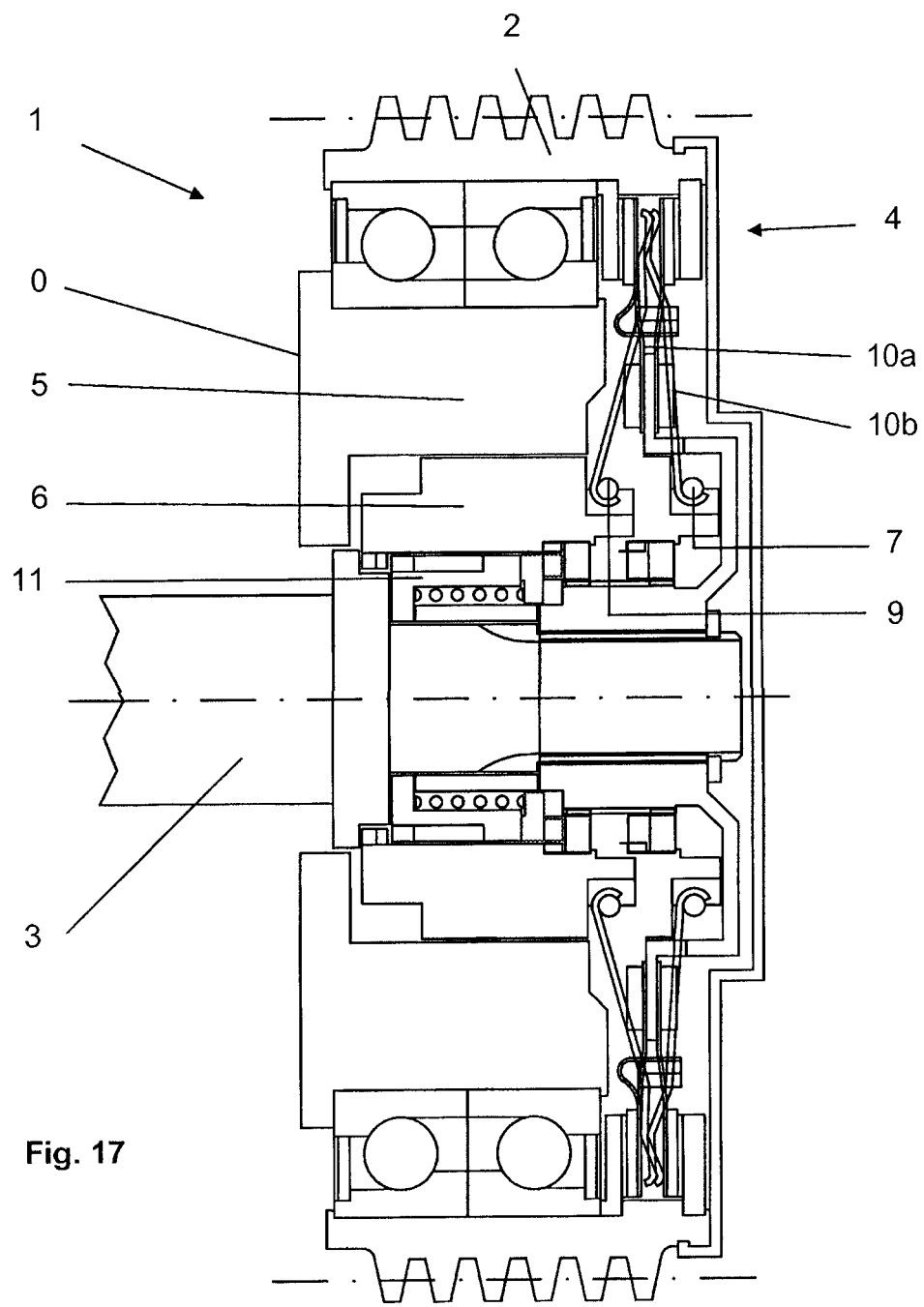
Figure 18:
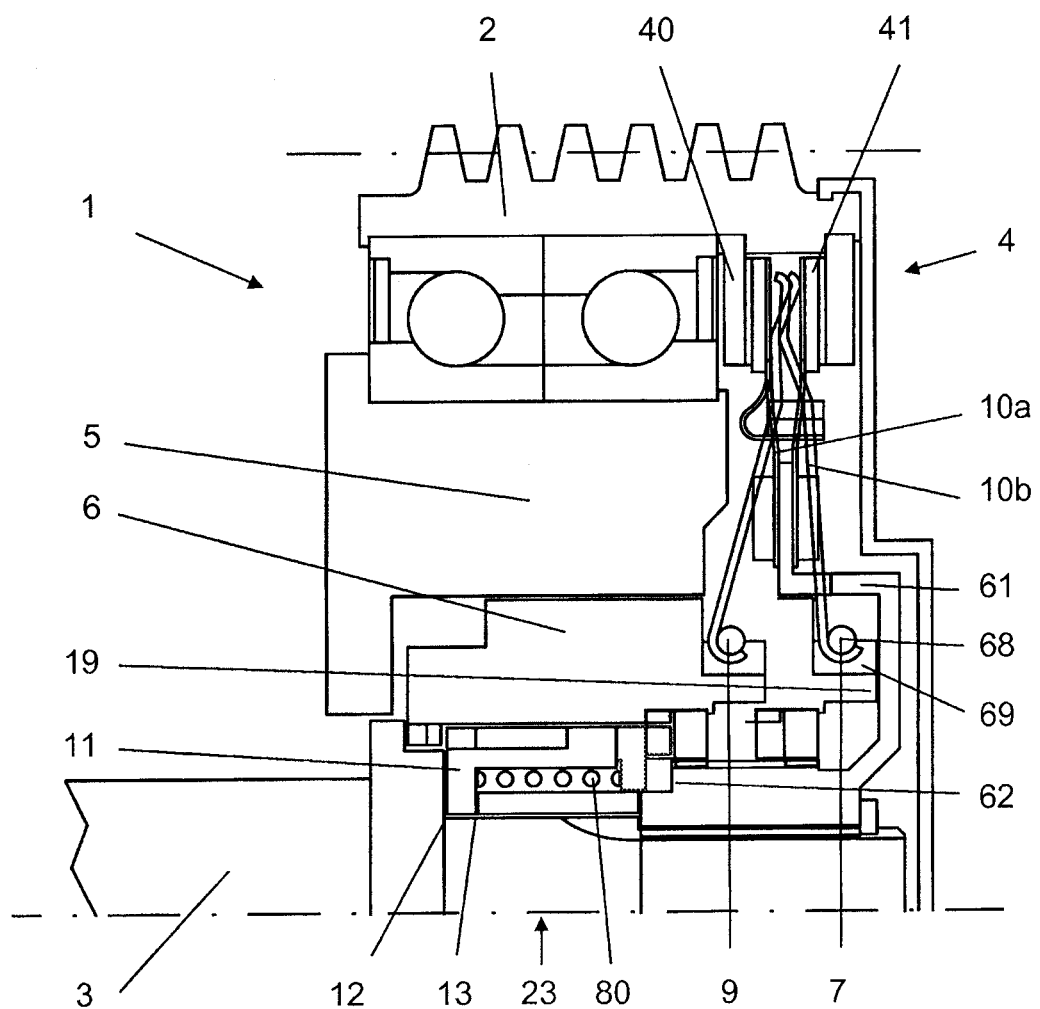

FIG. 17 shows a third embodiment of the switchable coupling 1 according to the invention. Again, the coupling is in effect between a driving element 2 that is configured as a pulley and an output element 3 that is configured as an output shaft. FIG. 18 depicts further details of this embodied variant. This switchable coupling 1 preferably has an electromagnetic actuator 5. Alternately, a hydraulic actuator is possible as well. The actuator 5 is again seated inside a housing 0 that supports the driving element 2. The coupling system 4 of this switchable coupling contains a friction clutch with two non-positive surfaces of the kind, as also known, in principle, from the prior art. FIGS. 17 and 18 demonstrate the coupling system in the switching position "coupling—open" with the switching element 6 in the starting position 7, as well as in the switching position "coupling=closed" with the switching element 6 in the end position 9.

As depicted in FIG. 18, the friction clutch comprises the two clutch discs 40 that are connected in a torque-proof manner to the driving element 2, and the two friction discs 41 that are connected in a torque-proof manner, by two spring plates as first elastic actuating elements 10a, to a disc support 61, preferably by a riveted connection. The disc support 61 is engaged with the output element 3 via a toothed shaft connection and held in the axial direction by a snap ring (alternatively, a screwed connection). Between the two spring plates 10a are located a plurality of spring levers as second elastic actuating elements 10b. The second elastic actuating elements 10b again engage by the ends thereof inside a retaining ring 68 that is snapped in place in the grooves of a plurality of retaining noses 69 on the switching element 6. The switching element 6 extends once again into the inside diameter of the actuator 5. When the actuator is activated, the switching element is moved to the left in FIGS. 17 and 18, thereby loading the elastic actuating elements 10a and 10b. In fact, the spring levers 10b are configured such that, with the movement of the switching element 6 in the direction toward the end position 9, they spread the spring plates 10a apart, thereby closing the friction clutch already in the central position 8 of the switching element 6. The spring levers 10b, however, can be deformed further in order to take up further energy until the switching element 6 reaches the end position 9. During this axial movement, the switching element 6 is once again in a complex engagement with a locking unit 11 that, however, cannot be displaced in the axial direction because the same is seated with minimal play between two axial stops 12 and 13.

Figure 19:
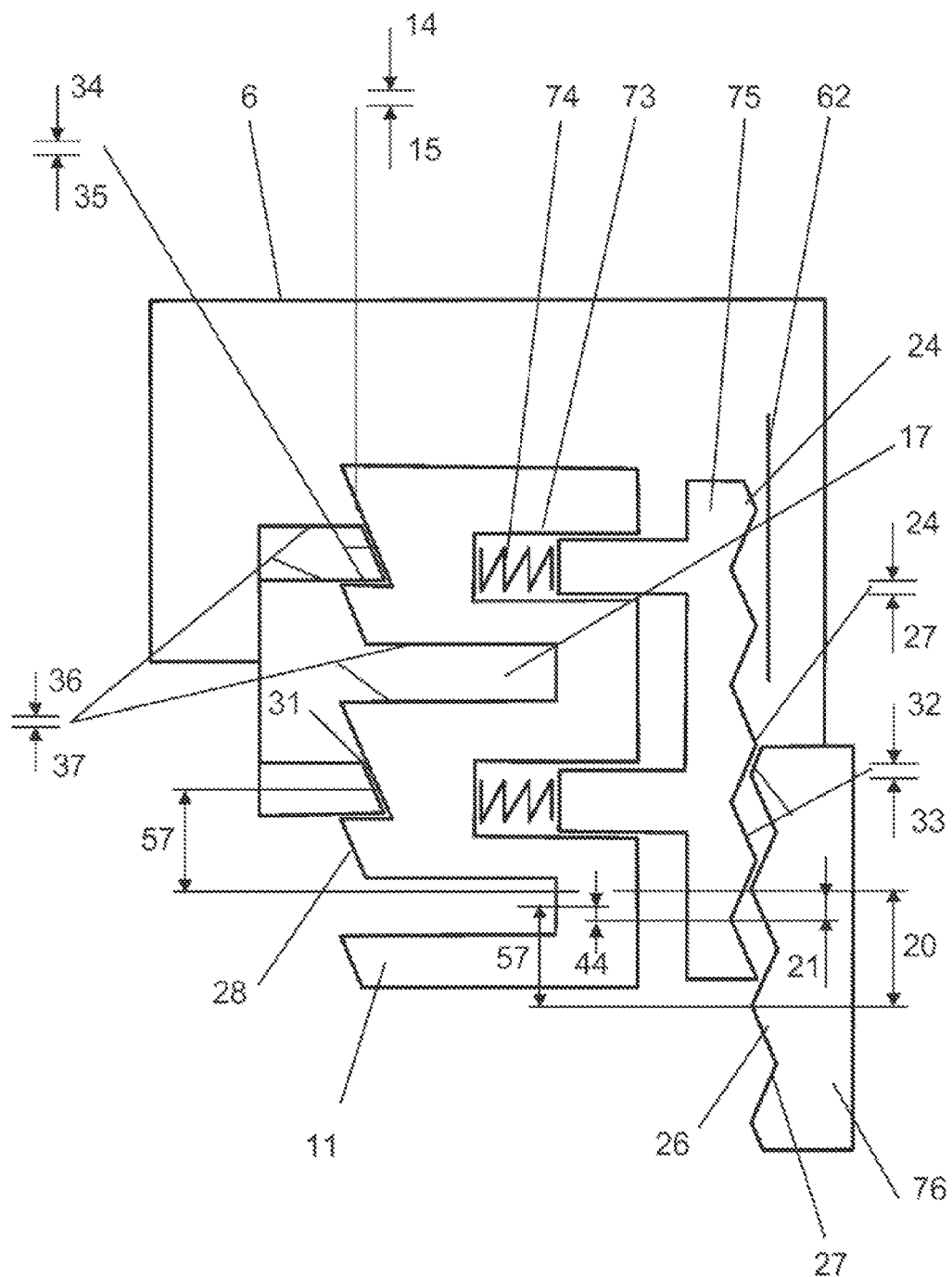

FIG. 19 illustrates the arrangement, in principle, of switching element 6, locking unit 11 and rotational system 23, which is elastically connected in this embodied variant to the locking unit 11. The locking unit 11 has a plurality of guide grooves. An end toothed ring 75 of the rotational system 23 engages in these guide grooves 73. In this embodied variant, axial springs 74 are seated in these guide grooves that push the end toothed ring 75 of the rotational system in FIG. 19 toward the right. However, the end toothed ring 75 of the rotational system can be maximally moved as far as a stop 62 and out of the locking unit 11. Said stop 62 is embodied in the present embodied variant by a stop on the disc support 61, which is fixed in place in the axial direction in the switchable coupling 1.

Figure 20A:
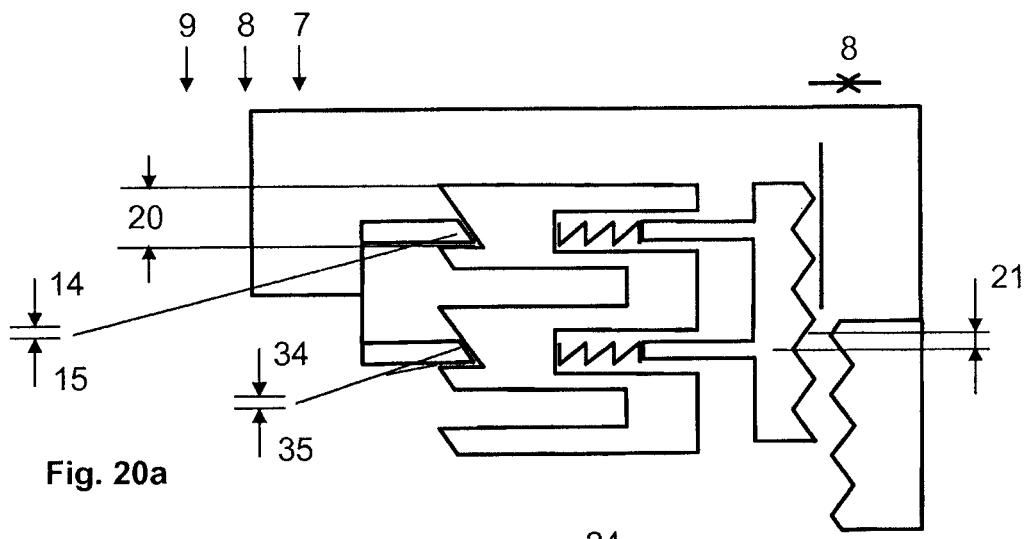
Figure 20B:
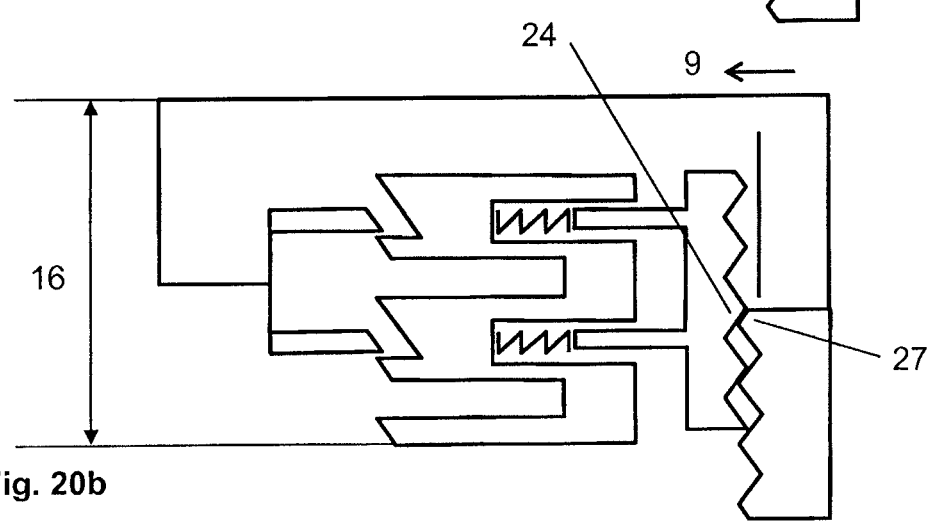
Figure 20C:
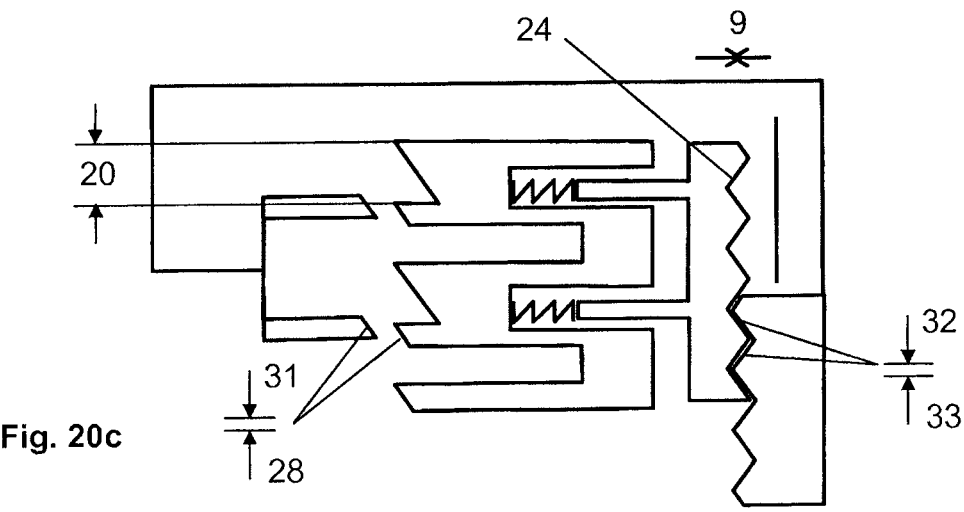
Figure 20D:
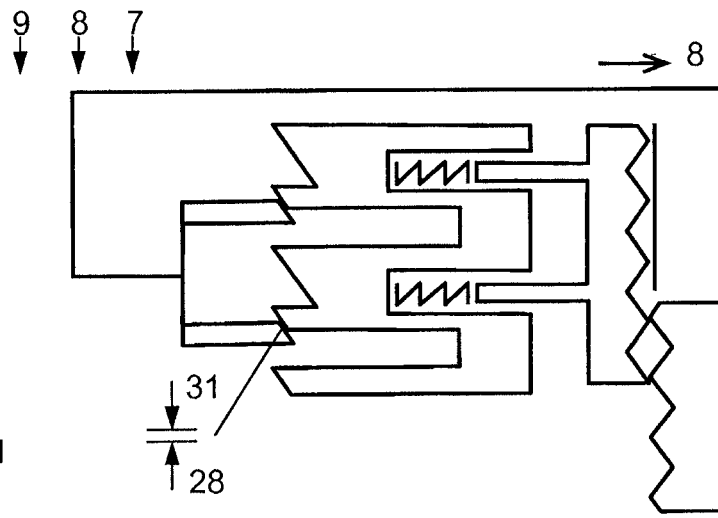
Figure 20E:
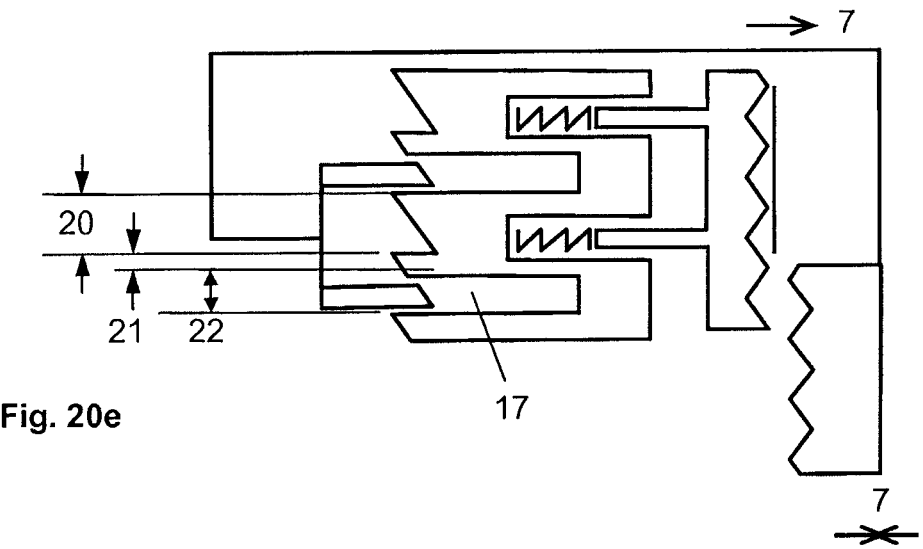
Figure 20F:
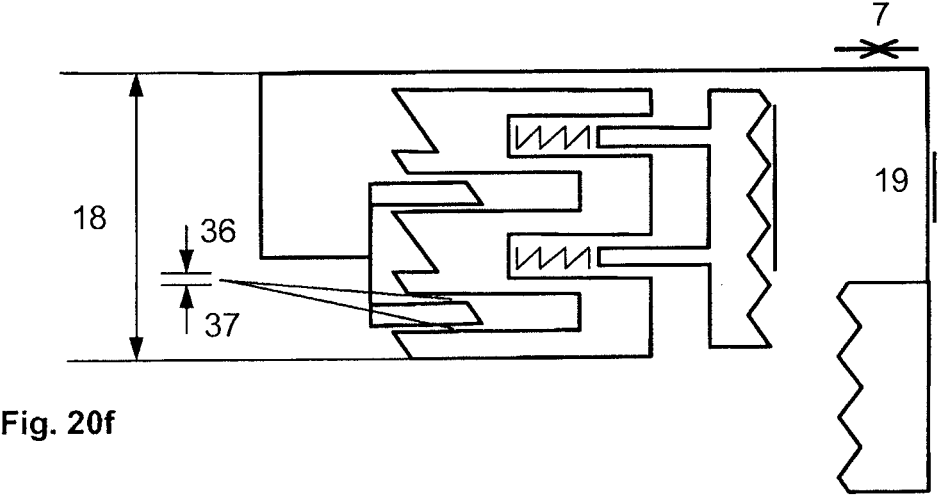

FIGS. 20a to 20f demonstrate the sequence of the relative positions between the switching element 6 with the rotational system 23 and the locking unit 11 between the axial stops thereof. In FIG. 20a, as in FIG. 19, the switching element is located in relation to the locking unit 11 in a first relative position 16 in the circumferential direction. In this relative position, the switching element 6 is only able to engage as far as the central position 8 in the locking unit 11, in which this embodied variant of the switchable coupling is in the state of "coupling=closed." In the central position 8, the switching element 6 makes contact with a switching element stop 14 on a locking unit stop 15 on the locking unit. The locking unit 11 has two positive-locking retaining elements 34 that are engaged in this central position 8 with second positive-locking retaining elements 35 on the switching element 6. The locking unit stop 15 and the second positive-locking retaining elements 34 on the locking unit 11 are in part formed by the same operative surfaces on the locking unit 11. Similarly, the switching element stop 14 and second positive-locking retaining elements 35 on the switching element 6 are in part formed by the same operative surfaces on the switching element 6. When the actuator 5 moves the switching element 6 in relation to the locking unit in the direction of the end position 9, as seen in FIG. 20 toward the left, the operative surfaces 24 of the rotational system 23 that is elastically connected in this embodied variant with the locking unit 11 make contact with the first slanting molded elements 27 on an end toothed ring 76 of the switching element 6, preloading the axial springs 74 as first elastic rotational elements 25. However, the switching element 6 is not yet able at this point to rotate in relation to the locking unit 11, because two positive-locking retaining elements 34 are still engaged in the locking unit with second positive-locking retaining elements 35 on the switching element. Only when, as depicted in FIG. 20c, these second retaining elements are disengaged from the end position 9, are the axial springs 74 as first elastic rotational elements 25 able to relax, thereby rotating the locking unit 11 in relation to the switching element 6 by a first angular pitch 21.

After the rotation around said first angular pitch 21, first positive-locking retaining elements 32 on the locking unit, which are then engaged with first positive-locking retaining elements 33 on the switching element, prevent any inadvertent further rotation. In the present embodied variant, these first retaining elements are the teeth of the end toothed rings 75 of the rotational system 76 of the switching element that is connected to the locking unit 76 and held in the engagement position by the axial springs 74.

The geometric requirement for the correct contact between the operative surfaces 24 of the rotational system 23 that is connected to the locking unit 11 and the slanting molded elements 27 on the switching element 6 for this third embodied variant is that the angular pitch 57 between the first positive-locking retaining elements 33 and the second positive-locking retaining elements 35 on the switching element 6, minus the offset angle 44 between the first positive-locking retaining elements 32 and the second positive-locking retaining elements 34 on the locking unit 11, plus the first angular pitch 21 or minus the second partial angular pitch 22 is a whole-numbered multiple of the angular pitch 20 between the relative positions 16 and 18. In the third embodied example therein, this offset angle is greater zero, because said retaining elements are in fact not formed by coaxial grooves in the locking unit.

In this embodied variant of the coupling according to the invention 1, it is important, furthermore, that the angular pitch of both end toothed rings 75 and 76 is as great as the angular pitch 20. Following the rotation around the first angular pitch 21, the switching element 6 and the locking unit 11 are located in such a relative position that, following the deactivation of the actuator 5 and, due to forces from the elastic actuating elements 10 of the locking unit 11, the second operating surfaces 28 of the rotational systems 23 make contact with second slanting molded elements 31 on the switching element 6. With a further axial movement of the switching element 6 in the direction of the starting position 7, the axial springs 74 are now preloaded as second resilient rotational elements 29, and the locking unit 11 is rotated in relation to the switching element 6 by a second angular pitch 22, until the switching element 6 engages initially with second 35 and then with third positive-locking retaining elements 37 initially in second 34 and thereafter in third positive-locking retaining elements 36 on the locking unit 11. In this embodied variant as well, the second and third retaining elements on the locking unit and on the switching element are constituted by the same operative surfaces. This distinction is, as mentioned previously, only necessary in a comparison with the first embodied variant. The switching element 6 and the locking unit 11 remain in this second relative position 18 until the switching element 6 makes contact in the starting position 7 with a stop 19 for the switching element.

In the present embodied variant, this stop 19 is embodied as a stop on the disc support 61 that is axially fixed in place in the switchable coupling 1.

The third positive-locking retaining elements on the locking unit 36 presently constitute, simultaneously, the locking unit groove 17 through which the switching element 6 can glide together with all the molded elements thereof as far as starting position 7. In the present embodied example, the switchable coupling is in this starting position 7 in the switching position "coupling=open."

In the starting position 7, the rotational system 23 has been disengaged again by the operative surfaces 24 thereof from the switching element 6. The second resilient rotational elements 29 relax and the rotational system 23 returns to a relative position in relation to the switching element 6 in which, when the switching element 6 moves in the direction of the end position, first operative surfaces 24 of the rotational system make contact with first slanting molded elements 27 on the switching element 6.

In this embodied variant of the switchable coupling the first elastic rotational elements 25 are created by the interaction of the axial springs 74 with the slanting first operative surfaces 24 of the rotational system when the same make contact with the first slanting molded elements 27 on the switching element. The second resilient rotational elements 29 are created from the interaction of the same axial springs 74 with the second operative surfaces 28 of the rotational system, when the same make contact with the second slanting molded element 31 on the switching element. This is the only way in which it is possible in this embodied variant to create rotational torques in the circumferential direction over two operating surfaces using an axial spring. With the next movement of the switching element 6 as far as the end position 9, initiated by the activation of the actuator 5, the first resilient rotational element 25 is preloaded initially, then the locking unit 11 is rotated in relation to the switching element by an angular pitch 21, as soon as the switching element 6 disengages in the end position 9 from the locking unit 11, and the resilient rotational element 25 can relax again.

Following the deactivation of the actuator 5, the elastic actuating element 10 pulls the switching element 6 back in the direction of the starting position 7. The second operative surfaces 28 of the rotational system 23 therein make contact with second slanting molded elements 31 on the switching element 6, preloading the second resilient rotational elements 29 and rotating the locking unit 11 in relation to the switching element again by the second angular pitch 22. In the central position 8, the switching element again makes contact by the switching element stops 14 thereof with the locking unit stops 15 that limit the axial movement of the central position.

There exist further structural solutions for the configuration of the switching element 6, of the locking unit 11 and of the rotational system 23 in all three embodied variants, particularly for the configuration of the operative surfaces on the engagement elements of these parts, all of which have the same effect with regard to the basic function.

To summarize:

By certain molded elements, the switching element 6 is able to penetrate corresponding molded elements on the locking unit 11; specifically, in a first relative position as far as a central position 8 and in a second relative position as far as a starting position 7. In the starting position 7 and in the central position 8, the switchable coupling has different coupling states (open or closed). With a movement of the switching element 6 relative to the locking unit 11 from the central position 8 to the end position 9, the rotational system 23 provides for a rotation by a first angular pitch 21. With a reverse movement of the switching element 6 in relation to the locking unit 11 from the end position 9 as far as the central position 8, the rotational system 23 provides for the further rotation by a second partial angular pitch 22. The two partial angular pitches 21 and 22 are combined into angular pitch 20. The locking unit 11 with the rotational system, eventually connected thereto, is therein never completely disengaged from the switching element 6 and the rotational system 23 that is eventually connected thereto. Therefore, it cannot inadvertently become misadjusted, either by itself or by other external effects, and move to an undesired position.

To the person skilled in the art it is naturally immediately obvious that the previously described components can also be constructed of further components if this will simplify the manufacture of the components.

Similarly, it is also clear to the person skilled in the art that the different locking systems comprised of switching element 6, locking unit 11 and rotational system 23, which are explained in an exemplary manner in a variant of the switchable coupling, can also be used in the context of the other coupling variants.

LIST OF REFERENCE NUMERALS

0 Housing
1 Switchable coupling
2 Driving element
3 Output element
4 Coupling system
5 Actuator
6 Switching element
7 Starting position
8 Central position
9 End position
10 Elastic actuating element
10a First elastic actuating element
10b Second elastic actuating element
11 Locking unit
12 First axial stop for the locking unit
13 Second axial stop for the locking unit
14 Switching element stop
15 Locking unit stop
16 First relative position in the circumferential direction
17 Locking unit groove
18 Second relative position in the circumferential direction
19 Stop for the switching element in the starting position
20 Angular pitch
21 First angular pitch
22 Second angular pitch
23 Rotational system
24 First operative surfaces of the rotational system
25 First resilient rotational elements
26 First slanting molded elements on the locking unit
27 First slanting molded elements on the switching element
28 Second operative surfaces of the rotational system
29 Second resilient rotational elements
30 Second slanting molded elements on the locking unit
31 Second slanting molded elements on the switching element
32 First positive-locking retaining elements on the locking unit
33 First positive-locking retaining elements on the switching element
34 Second positive-locking retaining elements on the locking unit
35 Second positive-locking retaining elements on the switching element
36 Third positive-locking retaining elements on the locking unit
37 Third positive-locking retaining elements on the switching element
38 Sleeve support
39 Cover plate
40 Clutch disc
41 Friction disc
42 Switching tooth system 43 Coupling sleeve
44 Offset angle between first and second positive-locking retaining elements on the locking unit
45 Spring plate
46 Retaining arm
47 External edge of the spring plate
48 Internal edge of the spring plate
49 Elastic spokes of the spring plate
50 Solenoid
51 Stop tooth on the switching element
52 Short locking unit tooth
53 Long locking unit tooth
54 Elastic rotator
55 Spring tongues
56 Beveled end pieces
57 Angular pitch between first and second positive-locking retaining elements on the switching element
58 Axial stop for first resilient rotational elements
59 Axial stop for second resilient rotational elements
60 Retaining tab on the switching element
61 Disc support
62 Stop on the disc support
63 Spring support
64 Spring plates
65 Synchronizer ring
66 Stop teeth
67 Friction cone
68 Retaining ring
69 Retaining noses
70 Toothed ring of the rotational system
71 First stop in the circumferential direction in the switching element
72 Second stop in the circumferential direction in the switching element
73 Guide groove
74 Axial spring
75 End toothed ring of the rotational system
76 End toothed ring of the switching element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A switchable coupling for selectively connecting a drive element and a power take-off element, comprising:
    a coupling system, the coupling system operably arranged between the drive element and the power take-off element and operatively configured for at least one of non-positive and positive coupling of the drive element and the power take-off element;
    an actuator, which can switch between open-coupling and closed-coupling states;
    a switching element, the switching element being movable in a continuously variable manner between a starting position, a central position and an end position;
    at least one elastic actuating element disposed between an output element and the switching element;
    a locking unit arranged directly or indirectly on the output element, the locking unit being rotatable in a circumferential direction of the coupling system and constrained in an axial direction of the power take-off element between a first locking unit stop and a second locking unit stop, and a rotational system, the rotational system being connected to the switching element or the locking unit, having first operative surfaces configured to contact first slanting molded elements on the switching element on the other of the locking unit or the first slanting molded elements on the switching element during a movement of the switching element from a position in a vicinity of the central position toward the end position (9), such that a contact preloads first resilient rotational elements,
    wherein
    in the central position of the switching element, the switchable coupling has a different state than in the starting position,
    the elastic actuating element applies a force to the switching element toward the starting position,
    the actuator only applies forces to the switching element toward the end position having a maximum value in each position which exceed a force value of the elastic actuating element in that position, the rotational system is arranged to the locking unit relative to the switching element by a first angular pitch, and in that the rotational system,
    includes second operative surfaces configured such that, upon return movement of the switching element from the end position toward the central position, the second operative surfaces contact two second slanting molded elements on the locking unit or two second slanting molded elements on the switching element to preload two second resilient rotational elements and rotate the locking unit by a second angular pitch relative to the switching element.

2. The switchable coupling according to claim 1, wherein the locking unit is further configured such that following a first movement of the switching element from the starting position toward the end position and back to the central position, the locking unit is located at a first relative position in the circumferential direction of the coupling system relative to the switching element
    in the central position the switching element is in contact with a switching element stop in the axial direction with a first locking unit stop of the locking unit,
    the locking unit includes second positive-locking retaining elements, and the switching element includes second positive-locking retaining elements configured to engage with the locking unit second positive-locking retaining elements when the switching element is in the central position to fix the first relative position in the circumferential direction.

3. The switchable coupling according to claim 2,
    wherein
    the locking unit includes locking unit grooves,
    following a second movement of the switching element from the central position toward the end position and back to the central position, the locking unit is located at a second relative position in the circumferential direction relative to the switching element and from the central position the switching element is movable with all of molded elements thereof through the locking unit groves toward the starting position until the switching element is in contact with a stop for the switching element in the starting position,
    the locking unit includes third positive-locking retaining elements, and
    the switching element includes third positive-locking retaining elements configured to engage with the locking unit third positive-locking retaining elements a second relative position in each axial position of the switching element between the central position and the starting position to fix the second relative position in the circumferential direction.

4. The switchable coupling according to claim 3, wherein the first relative position and the second relative position between the switching element and the locking unit are offset in the circumferential direction by an angular pitch comprising the first angular pitch and the second partial angular pitch, and the angular pitch is an even-numbered angular pitch of 360°.

5. The switchable coupling according to claim 4, wherein when the switching element is in the central position, the first operative surfaces of the rotational system are disengaged from the switching element or the locking unit such that the first resilient rotational elements are relaxed.

6. The switchable coupling according to claim 5, wherein when the switching element is in the end position, the second operative surfaces of the rotational system are disengaged from the switching element or the locking unit such that the second resilient rotational elements are relaxed.

7. The switchable coupling according to claim 6, wherein the angular pitch is between the first positive-locking retaining elements and the second positive-locking retaining elements on the switching element, minus an offset angle between the first positive-locking retaining elements and the second positive-locking retaining elements on the locking unit, plus the first angular pitch or minus the second angular pitch a whole-numbered multiple of the angular pitch between the first relative position and the second relative position.

8. The switchable coupling according to claim 7, wherein when the switching element is located in the end position the first positive-locking retaining elements at the locking unit engage with first positive-locking retaining elements on the switching element to fix in place a relative positional relationship of the switching element and the locking unit in the circumferential direction.

* * * * *